(12) United States Patent
Fujibayashi

(10) Patent No.: US 6,542,301 B1
(45) Date of Patent: *Apr. 1, 2003

(54) ZOOM LENS AND IMAGE SCANNER USING IT

(75) Inventor: Kazuo Fujibayashi, Kawasaki (JP)

(73) Assignee: Canon Kabushiki Kaisha, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/179,879

(22) Filed: Oct. 28, 1998

(30) Foreign Application Priority Data

Oct. 30, 1997 (JP) .............................. 9-316070
May 29, 1998 (JP) ........................... 10-166123

(51) Int. Cl.⁷ .................. G02B 27/44; G02B 15/15; G02B 15/14
(52) U.S. Cl. ............... 359/565; 359/569; 359/576; 359/689; 359/676
(58) Field of Search ............... 359/676, 677, 359/680, 682, 683, 684, 685, 690, 689, 566, 565, 569, 686, 687, 570, 576

(56) References Cited

U.S. PATENT DOCUMENTS 4,629,294 A * 12/1986 Tanaka et al. ............... 359/686
4,666,257 A * 5/1987 Tanaka et al. ............... 359/686
4,854,669 A * 8/1989 Birnbach et al. ............ 359/559
4,991,942 A    2/1991 Fujibayashi et al. ......... 350/423
5,229,880 A * 7/1993 Spencer et al. ............. 359/566
5,253,113 A * 10/1993 Sekita et al. ............... 359/680
5,268,790 A   12/1993 Chen .......................... 359/558
5,434,710 A * 7/1995 Zozawa ....................... 359/689
5,589,983 A * 12/1996 Meyers et al. ............... 359/566
6,014,267 A * 1/2000 Tsurutani et al. ............ 359/689
6,049,435 A * 4/2000 Abe ............................ 359/689
6,052,234 A * 4/2000 Mukai et al. ................ 359/643
6,078,434 A * 6/2000 Ori ............................ 359/689
6,147,811 A * 11/2000 Fujibayashi ................. 359/689

FOREIGN PATENT DOCUMENTS

GB    1023353   * 5/1966    ............... 359/676
JP    9-113804    5/1997
JP    9-197274    7/1997

* cited by examiner

Primary Examiner—John Juba, Jr.
(74) Attorney, Agent, or Firm—Fitzpatrick, Cella, Harper & Scinto

(57) ABSTRACT

A zoom lens includes three lens units which are a first unit having a negative refracting power, a second unit having a positive refracting power, and a third unit having a positive refracting power arranged in the stated order from the side of an original surface. Zooming is effected by changing an air space between the first unit and the second unit and an air space between the second unit and the third unit. The second unit has a diffractive optical element.

12 Claims, 18 Drawing Sheets

ZOOM LENS AND IMAGE SCANNER USING IT

BACKGROUND OF THE INVENTION

1. Field of the Invention

The present invention relates to a zoom lens and an image scanner using it and, more particularly, to those permitting zooming in a state in which the object-image distance is maintained at a constant finite distance.

2. Related Background Art

Many conventional image scanners use an imaging lens constructed of a unifocal lens. The image scanners of this type are adapted to digital reading by a line sensor (CCD), so that enlargement of an image, etc., can be performed by electronic zooming. In general the electronic zooming has a problem that degradation of the image is unavoidable, however, because an image comprised of the fixed number of pixels is enlarged.

In recent years, development is quickly proceeding to achieve higher image quality for displays and printers of personal computers. With this trend image scanners are also becoming ready for higher resolution. In the future, optical zooming will become necessary for achieving a substantially higher quality of an enlarged image.

A zoom lens for an image scanner using this optical zooming is suggested, for example, in Japanese Patent Application Laid-Open No. 9-113804. In this application the zoom lens has two lens units, a first lens unit having a negative refracting power and a second unit having a positive refracting power in the stated order from the object side, and zooming is effected by varying the distance between the first unit and the second unit. The scanner in this application is, however, inferior in brightness of the edge of image field and in distortion to the conventional image scanners using the unifocal lens.

A zoom lens that makes use of a diffractive optical element in order to control the occurrence and variation of chromatic aberration of the zoom lens to a low level is suggested, for example, in U.S. Pat. No. 5,268,790. In the patent, the diffractive optical element is used in the second unit, which is a main zooming unit, and in the third unit, which is a correcting unit.

A zoom lens equipped with the diffractive optical element for correction of chromatic aberration is suggested, for example, in Japanese Patent Application Laid-Open No. 9-197274. The lens of this application has two lens units, a first unit having a positive refracting power and a second unit having a negative refracting power in the stated order from the object side, the diffractive optical element is placed in the first unit or in the second unit, and zooming from the wide-angle extreme to the telephoto extreme is effected by narrowing the spacing between the first unit and the second unit. The zoom lens suggested in this application is, however, used for lens shutter cameras, and, therefore, the optical performance thereof was insufficient as to chromatic aberration, image surface characteristics, and distortion for application to image scanners.

SUMMARY OF THE INVENTION

In general, the image scanners need to read the image faithfully throughout the entire region of an original surface and thus are required to have a resolving power of a certain fixed level or higher over the entire region of the field without distortion. In the color reading case, the requirements are, for example, that focus positions are aligned with each other among beams of respective colors of R (red), G (green), and B (blue) and that no chromatic deviation occurs in the image field. Since an image sensor used as a reading element in the image scanner has a narrow latitude, it is necessary to assure as much brightness of the edge of the image field with respect to the center as possible.

Further, the zoom lenses used in the image scanners have to have so high an optical performance as not to allow the aberration variation amount that is practically allowed for the zoom lenses, for example, including photographic lenses, video lenses, and so on.

An object of the present invention is to provide a zoom lens and an image scanner therewith that have a high optical performance throughout the entire zooming range while ensuring a zoom ratio as high as about the zoom ratio 2.0 and that are ready for color reading, by properly setting a lens configuration of each lens unit in a three-unit zoom lens and providing the second unit with a diffractive optical element.

A zoom lens of the present invention is a zoom lens comprising three lens units, a first unit having a negative refracting power, a second unit having a positive refracting power, and a third unit having a positive refracting power in the stated order from the side of an original surface, in which zooming is effected by changing an air space between the first unit and the second unit and an air space between the second unit and the third unit, wherein the second unit comprises a diffractive optical element.

Particularly, another zoom lens of the present invention is: a zoom lens comprising three lens units, a first unit having a negative refracting power, a second unit having a positive refracting power, and a third unit having a positive refracting power in the stated order from the side of an original surface, in which zooming is effected by changing an air space between the first unit and the second unit and an air space between the second unit and the third unit, wherein the first unit has a first diffractive optical element and the second unit has a second diffractive optical element.

More specifically, the zoom lens of the present invention is characterized by either of the following features:

the first diffractive optical element corrects a variation in lateral chromatic aberration due to the zooming and the second diffractive optical element corrects variation in axial chromatic aberration due to the zooming;

a stop is placed in the second unit and the second diffractive optical element is placed near the stop;

the first diffractive optical element is attached to a negative refracting surface of a lens forming the first unit;

the following conditions are satisfied:

$$0.7 < |\beta_{2w} \times \beta_{3w}| < 1.1$$

and $$\beta_{2w} \times \beta_{3w} < 0$$

where $\beta_{2w}$ and $\beta_{3w}$ are image magnifications at the shortest focal length of the second unit and the third unit, respectively;

where phase functions of the first and second diffractive optical elements are defined by the following equation:

$$\phi_i(h) = (2\pi/\lambda) \Sigma C_{i(j)} h^i$$

(where $\lambda$ is a reference wavelength, h is a height from the optic axis, i is a degree, and j is a number of each diffractive optical element), and where al focal length at the shortest focal length of the overall system is fw, the following conditions are satisfied:

$$0.0005 < C_{2(1)} \times fw < 0.005$$
$$0.005 < |C_{2(2)} \times fw| < 0.03$$
$$(C_{2(2)} < 0);$$

each of the first and second diffractive optical elements is comprised of a stack type diffraction grating in which a plurality of diffraction gratings are stacked on a glass substrate;

zooming from the shortest focal length extreme to the longest focal length extreme is effected by moving the first unit along a convex locus on the image surface side and monotonically moving the second and third units toward the original surface, and an object-image distance is constant;

in order from the original surface side, the first unit has three lenses, a (1-1) negative lens, a (1-2) negative lens, and a (1-1) positive lens, the second unit has five lenses, a (2-1) positive lens, a (2-2) positive lens, a (2-1) negative lens, a (2-2) negative lens-, and a (2-3) positive lens, and the third unit has two lenses, a (3-1) positive lens and a (3-1) negative lens;

in order from the original surface side, the first unit has four lenses, a (1-1) negative lens, a (1-1) positive lens, a (1-2) negative lens, and a (1-2) positive lens, the second unit has four lenses, a (2-1) positive lens, a (2-2) positive lens, a (2-1) negative lens, and a (2-3) positive lens, and the third unit has two lenses, a (3-1) positive lens and a (3-1) negative lens;

in order from the original surface side, the first unit has four lenses, a (1-1) negative lens, a (1-1) positive lens, a (1-2) negative lens, and a (1-2) positive lens, the second unit has five lenses, a (2-1) positive lens, a (2-2) positive lens, a (2-1) negative lens, a (2-2) negative lens, and a (2-3) positive lens, and the third unit has two lenses, a (3-1) positive lens and a (3-1) negative lens;

in order from the original surface side, the first unit has three lenses, a (1-1) negative lens, a (1-2) negative lens, and a (1-1) positive lens, the second unit has four lenses, a (2-1) positive lens, a (2-2) positive lens, a (2-1) negative lens, and a (2-2) negative lens, and the third unit has two lenses, a (3-1) positive lens and a (3-1) negative lens;

in order from the original surface side, the first unit has three lenses, a (1-1) negative lens, a (1-2) negative lens, and a (1-1) positive lens, the second unit has three lenses, a (2-1) positive lens, a (2-2) positive lens, and a (2-1) negative lens, and the third unit has three lenses, a (3-1) negative lens, a (3-1) positive lens, and a (3-2) negative lens; and so on. By "(i-j) positive (negative) lens" is here meant the j-th positive (negative) lens in the i-th group.

Particularly, another zoom lens of the present invention is a zoom lens comprising three lens units, a first unit having a negative refracting power, a second unit having a positive refracting power, and a third unit having a positive refracting power in the stated order from the side of an original surface, in which zooming is effected by changing an air space between the first unit and the second unit and an air space between the, second unit and the third unit, wherein the second unit has a diffractive optical element and at least one lens unit out of the three lens units of the first, second, and third units has an aspherical surface.

Particularly, the zoom lens of the present invention is characterized by either of the following features:

the diffractive optical element corrects a variation in axial chromatic aberration due to the zooming;

a stop is placed in the second unit and the diffractive optical element is placed near the stop;

the first unit has an aspherical surface;

the second unit has an aspherical surface;

the third unit has an aspherical surface;

each of the first unit and the third unit has an aspherical surface;

where image magnifications at the shortest focal length of the second and third units are $\beta_{2w}$ and $\beta_{3w}$, respectively, the following conditions are satisfied:

$$0.7 < |\beta_{2w} \times \beta_{3w}| < 1.1$$

and $$\beta_{2w} \times \beta_{3w} < 0;$$

where a phase function of the diffractive optical element is defined by the following equation:

$$\phi(h) = (2\pi/\lambda)\Sigma C_i h^i$$

(where $\lambda$ is a reference wavelength, h is a height from the optic axis, and i is a degree)

and where a focal length at the shortest focal length of the overall system is fw, the following condition is satisfied:

$$0.005 < |C_2 \times fw| < 0.03$$
$$(C_2 < 0);$$

zooming from the shortest focal length extreme to the longest focal length extreme is effected by moving the first unit along a convex locus on the image surface side and monotonically moving the second and third units toward the original surface, and an object-image distance is constant;

in order from the original surface side, the first unit has two lenses, a (1-1) negative lens and a (1-1) positive lens, the second unit has three lenses, a (2-1) positive lens, a (2-2) positive lens, and a (2-1) negative lens, and the third unit has two lenses, a (3-1) positive lens and a (3-1) negative lens;

in order from the original surface side, the first unit has two lenses, a (1-1) negative lens and a (1-1) positive lens, the second unit has four lenses, a (2-1) positive lens, a (2-2) positive lens, a (2-1) negative lens, and a (2-2) negative lens, and the third unit has two lenses, a (3-1) positive lens and a (3-1) negative lens; and so on.

An image scanner of the present invention is characterized in that the zoom lens described in either one of the above is used for the image scanner.

BRIEF DESCRIPTION OF THE DRAWINGS

FIGS. 6A and 6B are aberration diagrams of Numerical Example 1 of the present invention, wherein FIG. 6A shows aberrations at the shortest focal length extreme and FIG. 6B shows aberrations at the longest focal length extreme;

FIGS. 7A and 7B are aberration diagrams of Numerical Example 2 of the present invention, wherein FIG. 7A shows aberrations at the shortest focal length extreme and FIG. 7B shows aberrations at the longest focal length extreme;

FIGS. 8A and 8B are aberration diagrams of Numerical Example 3 of the present invention, wherein FIG. 8A shows aberrations at the shortest focal length extreme and FIG. 8B shows aberrations at the longest focal length extreme;

FIGS. 9A and 9B are aberration diagrams of Numerical Example 4 of the present invention, wherein FIG. 9A shows aberrations at the shortest focal length extreme and FIG. 9B shows aberrations at the longest focal length extreme;

FIGS. 10A and 10B are aberration diagrams of Numerical Example 5 of the present invention, wherein FIG. 10A shows aberrations at the shortest focal length extreme and FIG. 10B shows aberrations at the longest focal length extreme;

FIGS. 24A and 24B are aberration diagrams of Numerical Example 6 of the present invention, wherein FIG. 24A shows aberrations at the shortest focal length extreme and FIG. 24B shows aberrations at the longest focal length extreme;

FIGS. 25A and 25B are aberration diagrams of Numerical Example 7 of the present invention, wherein FIG. 25A shows aberrations at the shortest focal length extreme and FIG. 25B shows aberrations at the longest focal length extreme;

FIGS. 26A and 26B are aberration diagrams of Numerical Example 8 of the present invention, wherein FIG. 26A shows aberrations at the shortest focal length extreme and FIG. 26B shows aberrations at the longest focal length extreme;

FIGS. 27A and 27B are aberration diagrams of Numerical Example 9 of the present invention, wherein FIG. 27A shows aberrations at the shortest focal length extreme and FIG. 27B shows aberrations at the longest focal length extreme; and FIGS. 28A and 28B are aberration diagrams of Numerical Example 10 of the present invention, wherein FIG. 28A shows aberrations at the shortest focal length extreme and FIG. 28B shows aberrations at the longest focal length extreme.

DETAILED DESCRIPTION OF THE PREFERRED EMBODIMENTS

Figure 1:
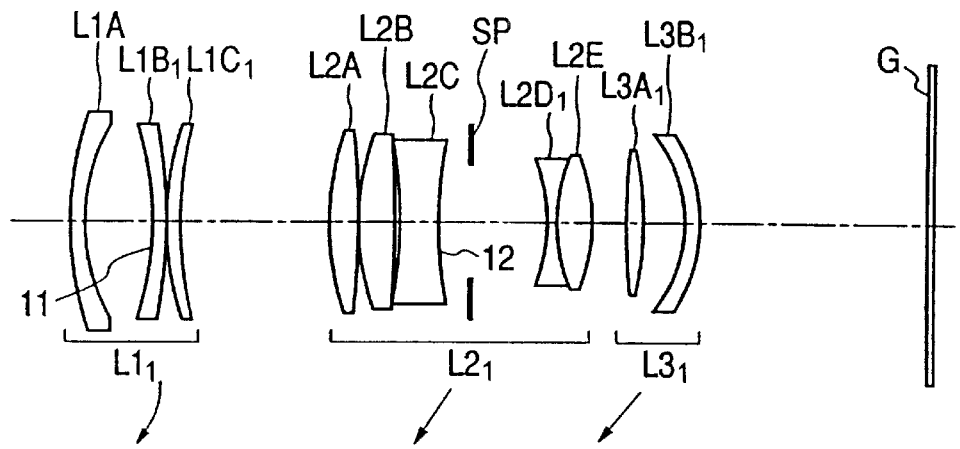
FIG. 1 is a sectional view of a lens in Numerical Example 1 of the present invention.

FIGS. 1 to 5 are sectional views of respective lenses in Numerical Example 1 to Numerical Example 5 of the present invention, respectively, as will be described below and FIGS. 6A and 6B to FIGS. 10A and 10B are aberration diagrams of Numerical Examples 1 to 5 of the present invention, respectively, as will be described below. Among the aberration diagrams, FIGS. 6A, 7A, 8A, 9A, and 10A show aberrations at the shortest focal length extreme (or at the lowest magnification) and FIGS. 6B, 7B, 8B, 9B, and 10B show aberrations at the longest focal length extreme (or at the highest magnification) In the drawings, g stands for the spectral g-line, e stands for the spectral e-line, c stands for the spectral c-line, M stands for the meridional image focus, and S stands for the change in sagittal image focus.). Each numerical example represents a numerical example of a zoom lens used in the image scanner.

In the figures, $L1_1$ through $L1_{10}$ indicates the first unit having the negative refracting power, the first unit $L1_1$ through $L1_{10}$ having a first diffractive optical element 11 for correcting variation in lateral chromatic aberration due to zooming. The first diffractive optical element 11 is attached to a negative refracting surface of a lens forming the first unit $L1_1$ through $L1_{10}$. Reference symbol $L2_1$ through $L2_{10}$ represents the second unit having the positive refracting power, the second unit. $L2_1$ through $L2_{10}$ having a second diffractive optical element 12 for correcting variation in axial chromatic aberration due to zooming. SP designates a stop, which is placed in the second unit $L2_1$ through $L2_{10}$ and which is moved in unison with the second unit $L2_1$ through $L2_{10}$ during zooming in the present invention. The second diffractive optical element 12 is located near the stop SP. Symbol $L3_1$ through $L3_{10}$ denotes the third unit having the positive refracting power. Symbol G represents a glass cover comprised of a plane-parallel plate for a line sensor (not illustrated), which is positioned near the image surface.

In Numerical Example 1 of FIG. 1, in order from the original surface side, the first unit $L1_1$ is constructed in a three-lens configuration composed of a (1-1) negative: lens $L1A_1$, a (1-2) negative lens $L1B_1$, and a (1-1) positive lens $L1C_1$, the second unit $L2_1$ is constructed in a five-lens configuration composed of a (2-1) positive lens L2A, a (2-2) positive lens L2B, a (2-1) negative lens L2C, a stop, a (2-2) negative lens $L2D_1$, and a (2-3) positive lens L2E, the third unit $L3_1$ is constructed in a two-lens configuration composed of a (3-1) positive lens $L3A_1$ and a (3-1) negative lens $L3B_1$, the first diffractive optical element 11 is attached to a lens surface on the original surface side of the (1-2) negative lens $L1B_1$ of the first unit, the stop SP is placed in the second unit $L2_1$, and the second diffractive optical element 12 is attached to a lens surface on the image surface side of the (2-1) negative lens L2C of the second unit.

Figure 2:
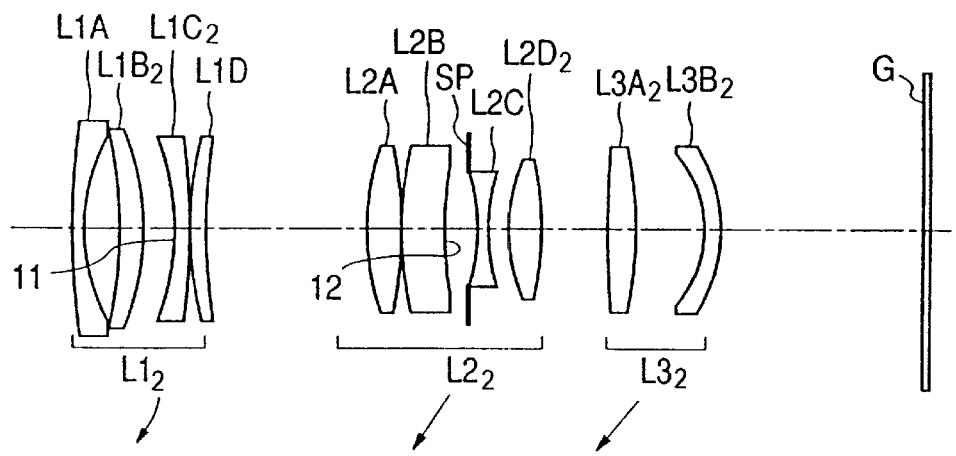
FIG. 2 is a sectional view of a lens in Numerical Example 2 of the present invention.

In Numerical Example 2 of FIG. 2, in order from the original surface side, the first unit $L1_2$ is constructed in a four-lens configuration composed of a (1-1) negative lens L1A, a (1-1) positive lens $L1B_2$, a (1-2) negative lens $L1C_2$, and a (1-2) positive lens L1D, the second unit $L2_2$ is constructed in a four-lens configuration composed of a (2-1) positive lens L2A, a (2-2) positive lens L2B, a (2-1) negative lens L2C, and a (2-3) positive lens $L2D_2$, the third unit $L3_2$ is constructed in a two-lens configuration composed of a (3-1) positive lens $L3A_2$ and a (3-1) negative lens $L3B_2$, the first diffractive optical element 11 is attached to a lens surface on the original surface side of the (1-2) negative lens $L1C_2$ of the first unit $L1_2$, the stop SP is placed in the second unit $L2_2$, and the second diffractive optical element 12 is attached to a lens surface on the image surface side of the (2-2) positive lens L2B.

Figure 3:
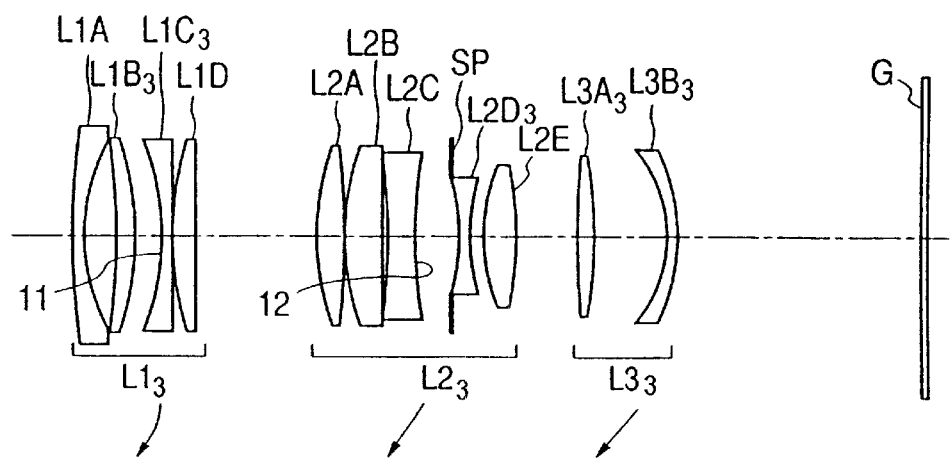
FIG. 3 is a sectional view of a lens in Numerical Example 3 of the present invention.

In Numerical Example 3 of FIG. 3, in order from the original surface side, the first unit $L1_3$ is constructed in a four-lens configuration composed of a (1-1) negative lens L1A, a (1-1) positive lens $L1B_3$, a (1-2) negative lens $L1C_3$, and a (1-2) positive lens L1D, the second unit $L2_3$ is constructed in a five-lens configuration composed of a (2-1) positive lens L2A, a (2-2) positive lens L2B, a (2-1) negative lens L2C, a (2-2) negative lens $L2D_3$, and a (2-3) positive lens L2E, the third unit $L3_3$ is constructed in a two-lens configuration composed of a (3-1) positive lens $L3A_3$ and a (3-1) negative lens $L3B_3$, the first diffractive optical element 11 is attached to a lens surface on the original surface side of the (1-2) negative lens $L1C_3$ of the first unit $L1_3$, the stop SP is placed in the second unit $L2_3$, and the second diffractive optical element 12 is attached to a lens surface on the image surface side of the (2-1) negative lens L2C of the second unit $L2_3$.

Figure 4:
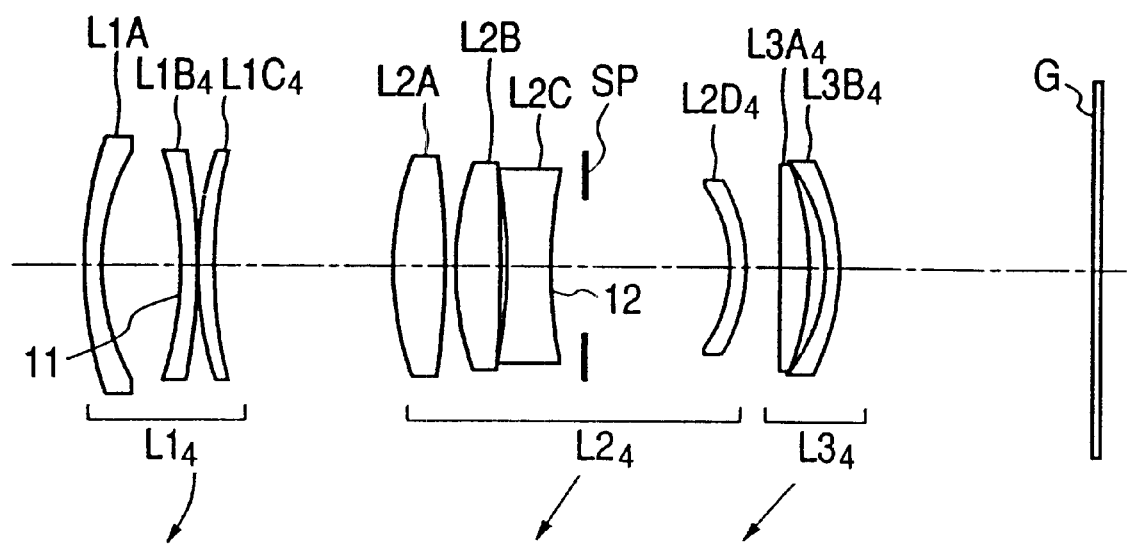
FIG. 4 is a sectional view of a lens in Numerical Example 4 of the present invention.

In Numerical Example 4 of FIG. 4, in order from the original surface side, the first unit $L1_4$ is constructed in a three-lens configuration composed of a (1-1) negative lens L1A, a (1-2) negative lens $L1B_4$, and a (1-1) positive lens $L1C_4$, the second unit $L2_4$ is constructed in a four-lens configuration composed of a (2-1) positive lens L2A, a (2-2) positive lens L2B, a (2-1) negative lens L2C, and a (2-2) negative lens $L2D_4$, the third unit $L3_4$ is constructed in a two-lens configuration composed of a (3-1) positive lens $L3A_4$ and a (3-1) negative lens $L3B_4$, the first diffractive optical element 11 is attached to a lens surface on the original surface side of the (1-2) negative lens $L1B_4$ of the first unit $L1_4$, the stop SP is placed in the second unit $L2_4$, and the second diffractive optical element 12 is attached to a lens surface on the image surface side of the (2-1) negative lens L2C of the second unit $L2_4$.

Figure 5:
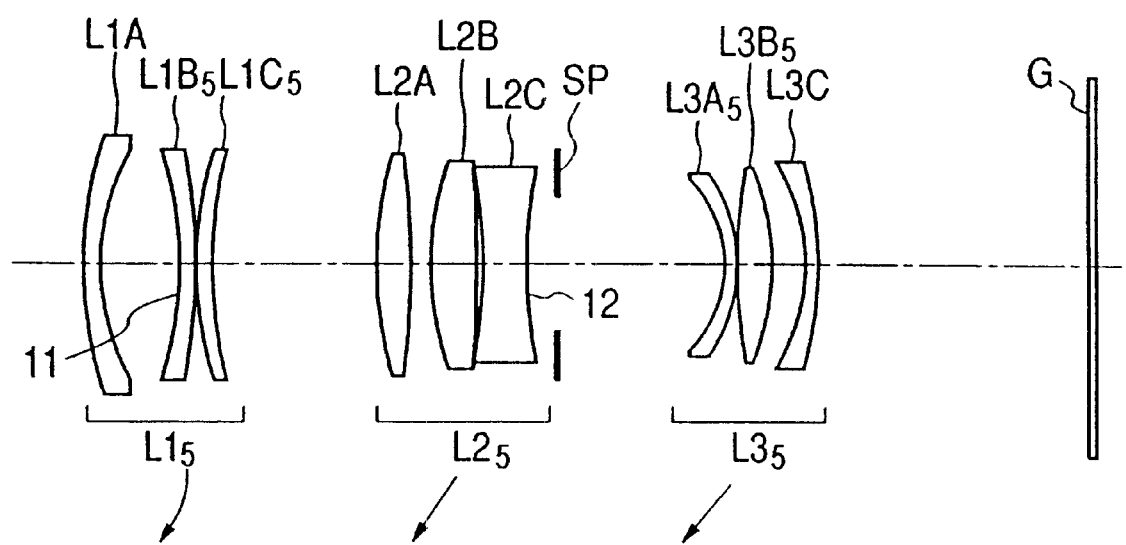
FIG. 5 is a sectional view of a lens in Numerical Example 5 of the present invention.
Figure 6A:
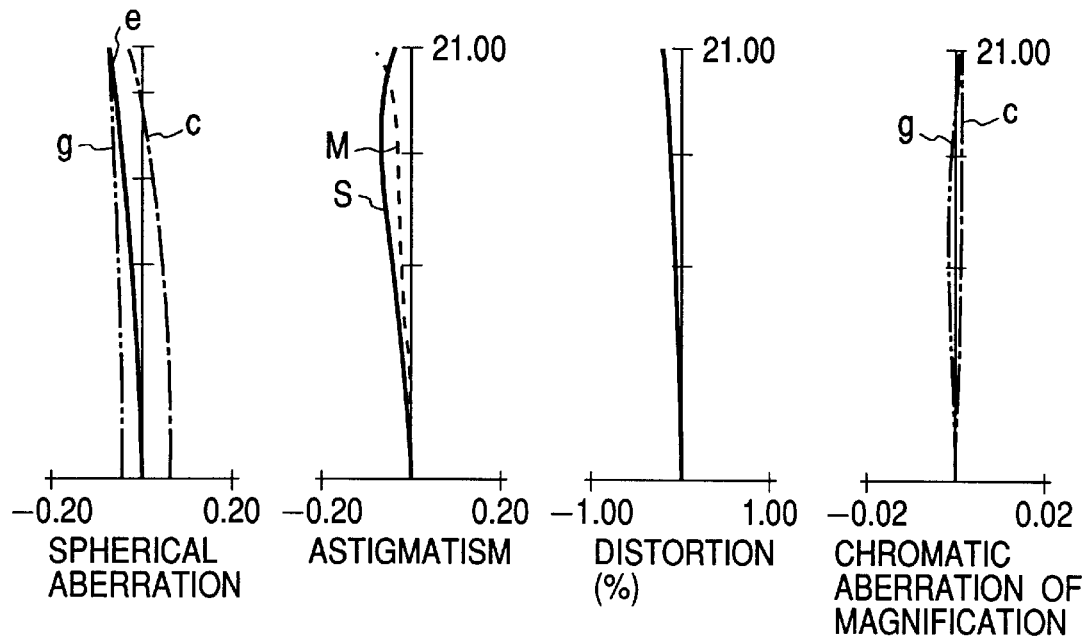
Figure 6B:
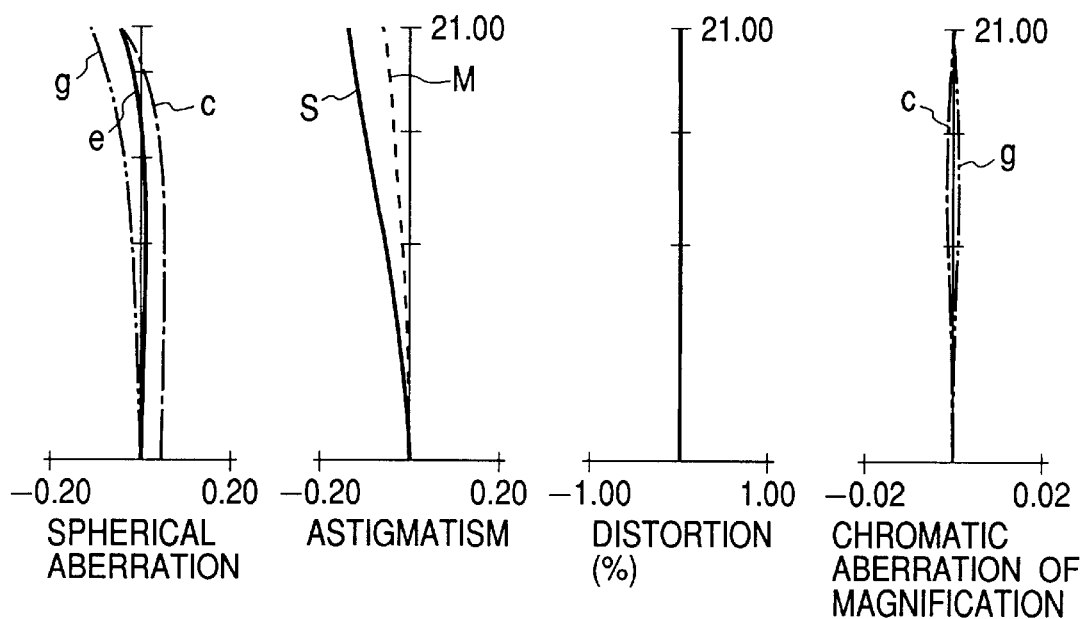
Figure 7A:
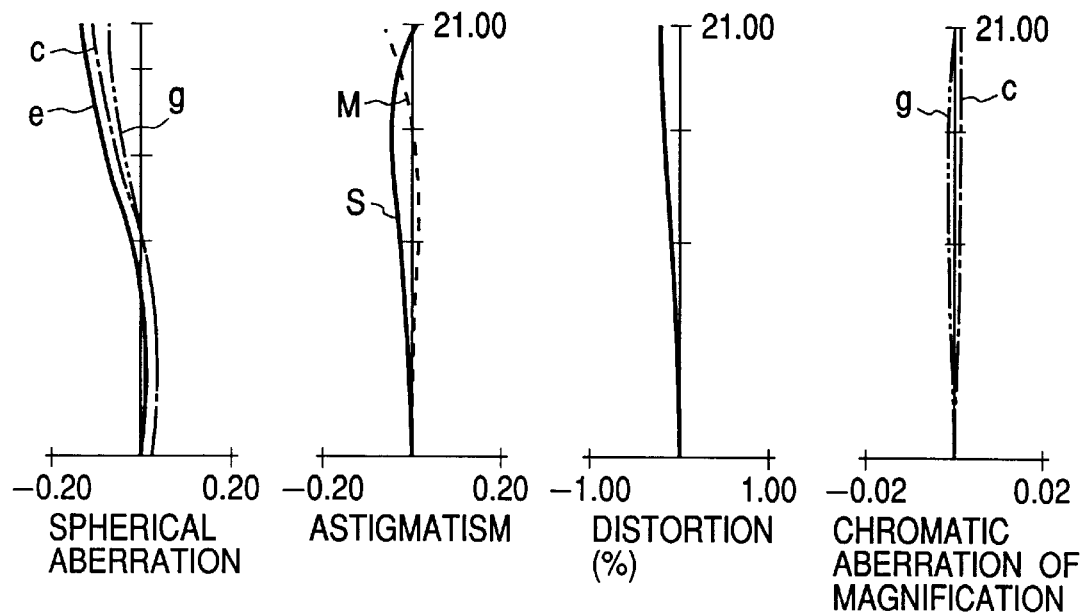
Figure 7B:
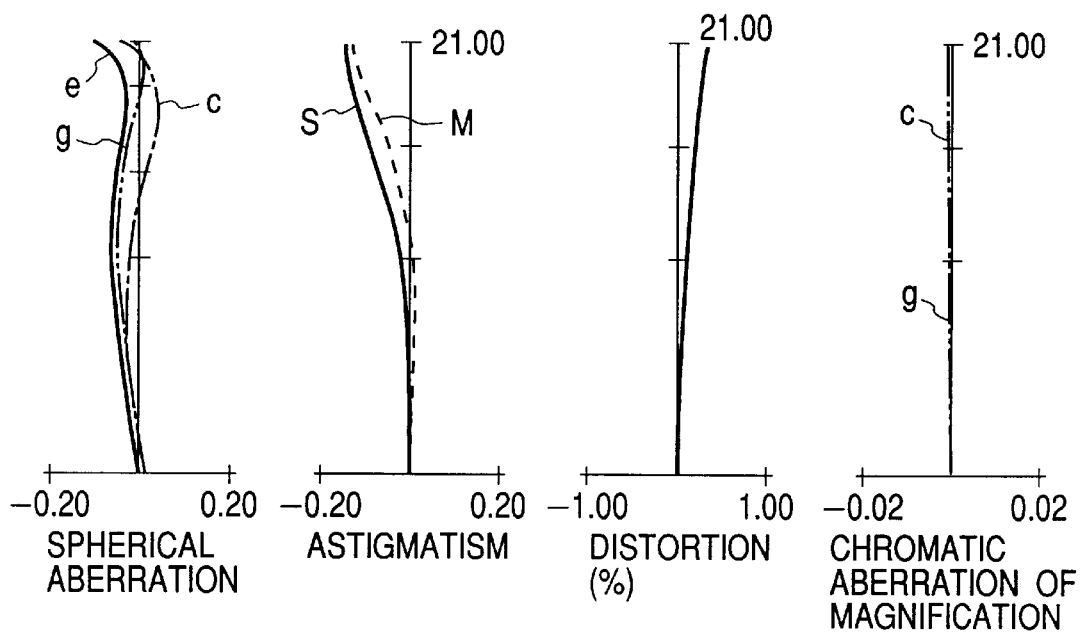
Figure 8A:
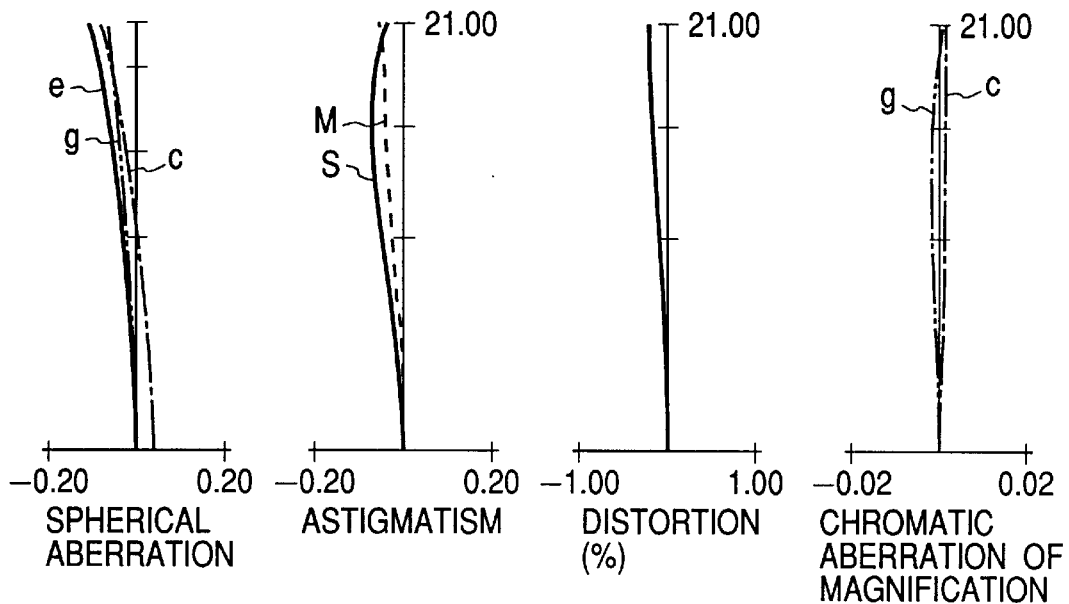
Figure 8B:
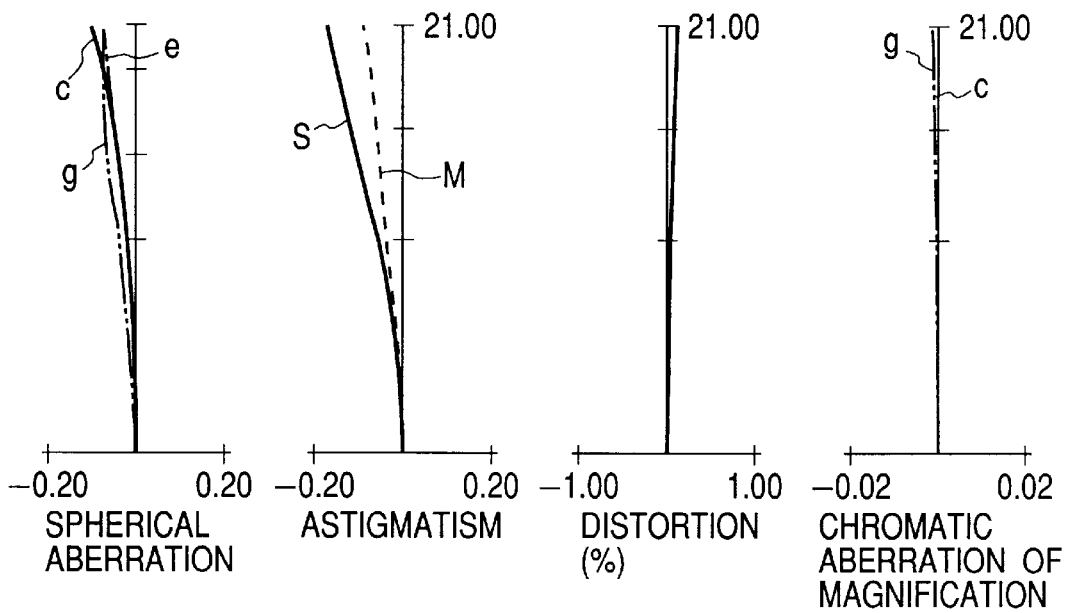
Figure 9A:
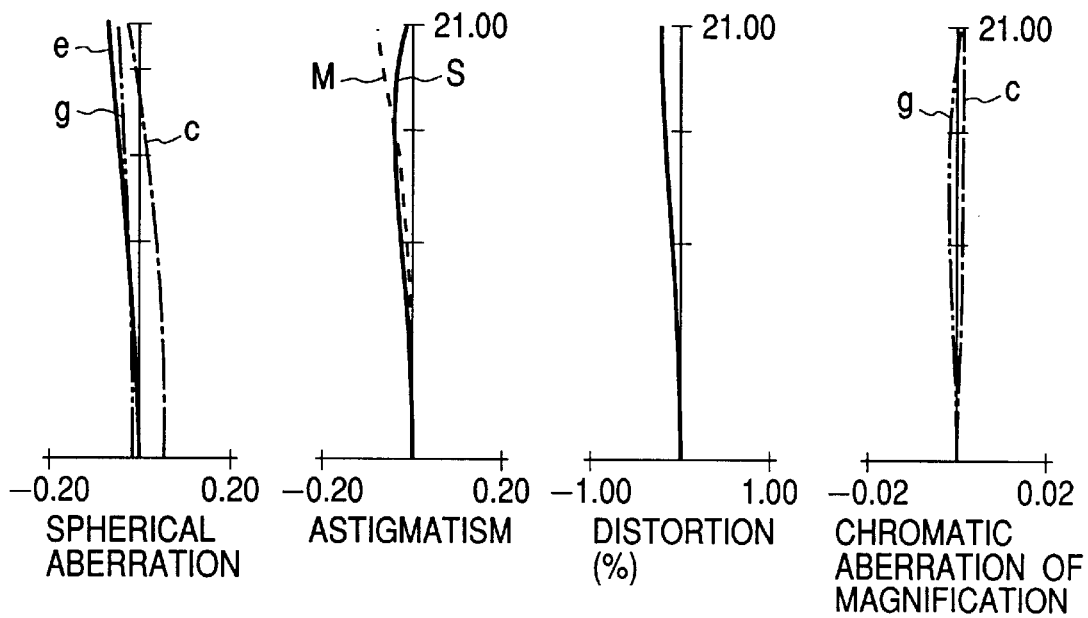
Figure 9B:
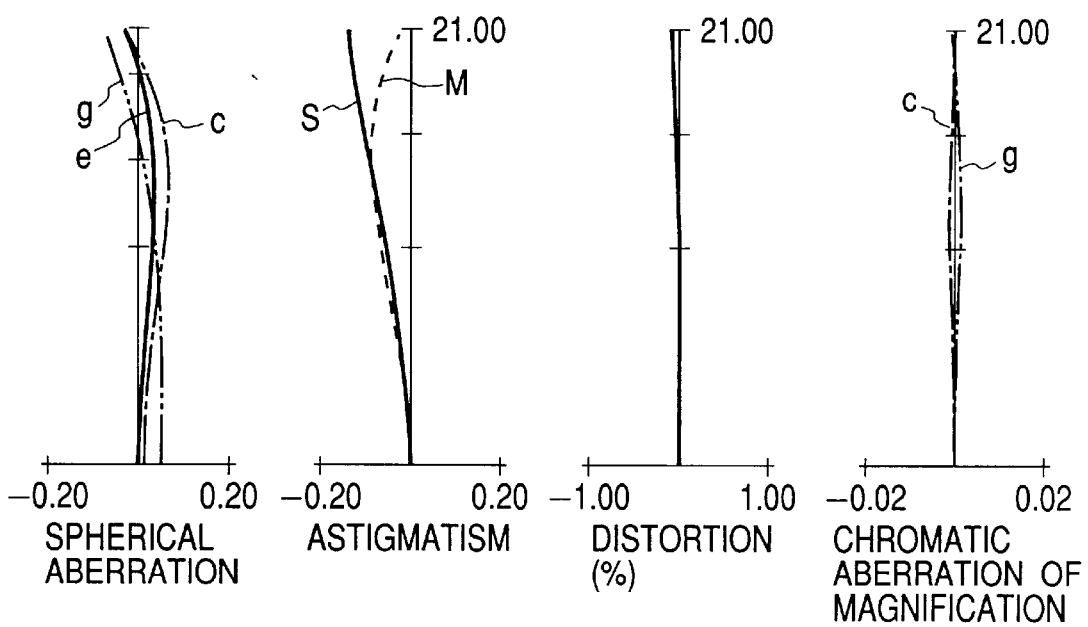
Figure 10A:
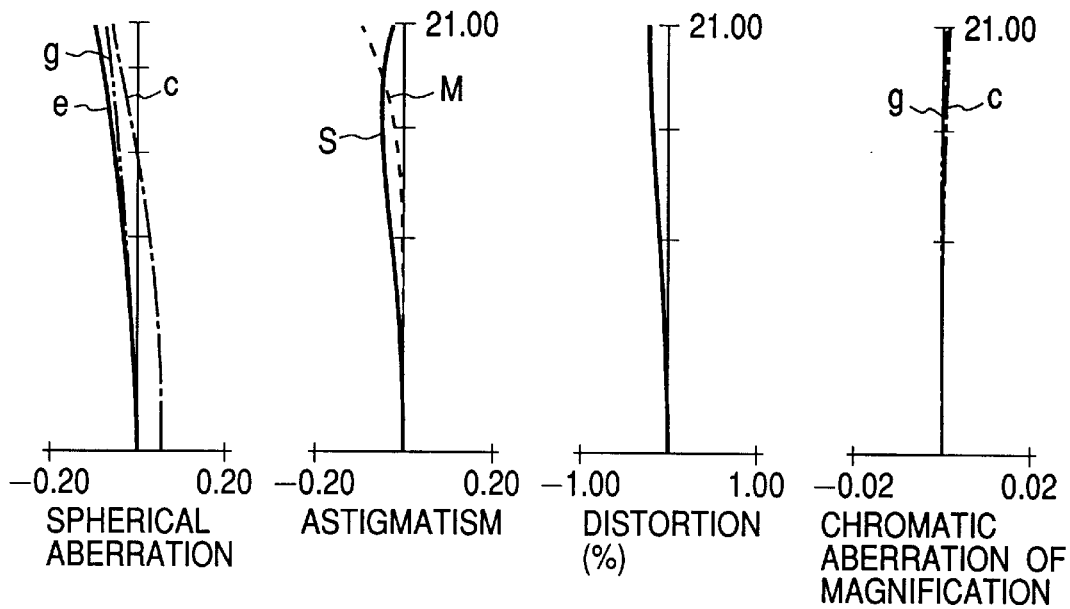
Figure 10B:
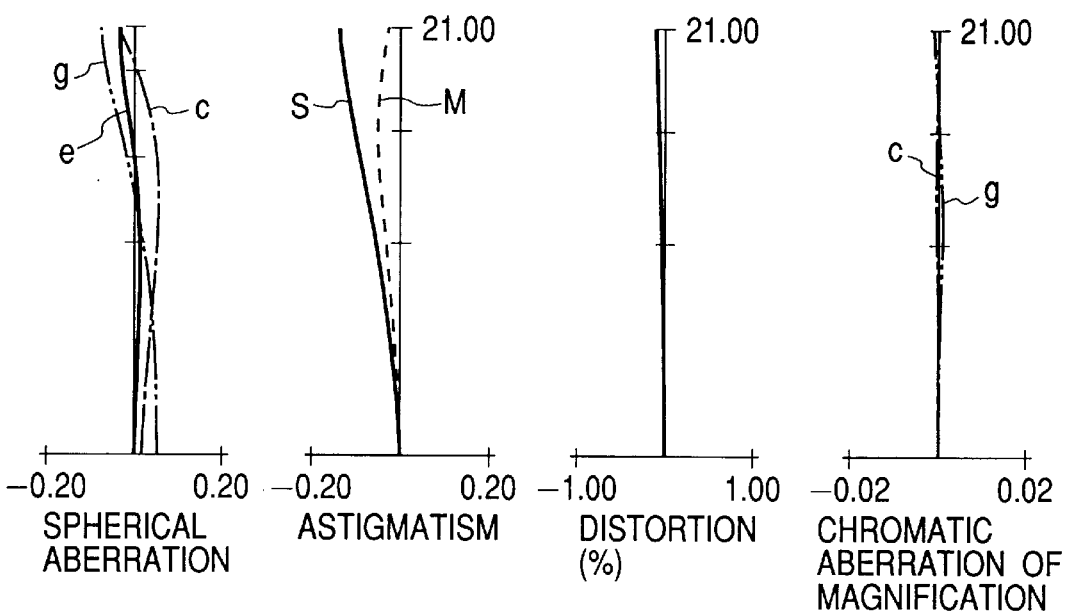

In Numerical Example 5 of FIG. 5, in order from the original surface side, the first unit $L1_5$ is constructed in a three-lens configuration composed of a (1-1) negative lens L1A, a (1-2) negative lens $L1B_5$, and a (1-1) positive lens $L1C_5$, the second unit $L2_5$ is constructed in a three-lens configuration composed of a (2-1) positive lens L2A, a (2-2) positive lens L2B, and a (2-1) negative lens L2C, the third unit $L3_5$ is constructed in a three-lens configuration composed of a (3-1) negative lens $L3A_5$, a (3-1) positive lens $L3B_5$, and a (3-2) negative lens L3C, the first diffractive optical element 11 is attached to a lens surface on the original surface side of the (1-2) negative lens $L1B_5$ of the first unit $L1_5$, the stop SP is placed in the second unit $L2_5$, and the second diffractive optical element 12 is attached to a lens surface on the image surface side of the (2-1) negative lens L2C of the second unit $L2_5$.

In each numerical example, the zoom lens has the first diffractive optical element 11 in the first unit $L1_1$ through $L1_{10}$, the stop SP in the second unit $L2_1$ through $L2_{10}$, and the second diffractive optical element 12 near the stop SP, as described above. As illustrated in FIGS. 1 to 5, change of magnification (zooming) from the shortest focal length extreme to the longest focal length extreme is achieved in such a manner that with maintaining the object-image distance at a constant finite distance, the first unit $L1_1$ through $L1_{10}$ is moved along a locus of a convex shape on the image surface side, the second and third units $L2_{10}$, $L3_1$ through $L3_{10}$ are monotonically moved toward the original surface, and the air space between the first and second units $L1_1$ through $L1_{10}$, $L2_1$ through $L2_{10}$ and the air space between the second and third units $L2_1$ through $L2_{10}$, $L3_1$ through $L3_{10}$ are changed concurrently..

In each numerical example, the first unit $L1_1$ through $L1_{10}$ has a negative refracting power, thereby decreasing the diameter of the front lens, which tends to be increased by zooming.

In each numerical example zooming is mainly effected by movement of the second and third units $L2_1$ through $L2_{10}$ $L3_1$ through $L3_{10}$; in that structure aberration variation due to the zooming, e.g. in curvature of field, will become larger in the intermediate part of zoom if the zoom ratio is as high as 2; therefore, the aberration variation is controlled to a low level by making the air space variable between the second and third units $L2_1$ through $L2_{10}$, $L3_1$ through $L3_{10}$ Further, the stop SP is placed in the second unit $L2_1$ through $L2_{10}$ so that the lens system is arranged to be as nearly symmetric with respect to the stop as possible, which facilitates correction for distortion, lateral chromatic aberration and so on.

In each numerical example, a variation in axial chromatic aberration and a variation in lateral chromatic aberration due to the zooming can be corrected to some extent by optimization of lens shapes in each lens unit, selection of glass materials, and so on.

However, a secondary spectrum remains as to both axial chromatic aberration and lateral chromatic aberration and it is thus difficult to align the focus positions of the three color beams of R (red), G (green), and B (blue) with each other, thus posing a problem of incapability of accurate color reading.

In each numerical example, the secondary spectrum of axial chromatic aberration is corrected for by the provision of the second diffractive optical element 12 near the stop SP in the second unit $L2_1$ through $L2_{10}$ while the secondary spectrum of lateral chromatic aberration is corrected for by attachment of the first diffractive optical element 11 to the negative (concave) refracting surface of the lens forming the first unit $L1_1$ through $L1_{10}$.

In the present invention, as described above, the zoom lens of each numerical example has the stop in the second unit $L2_1$ through $L2_{10}$ and maintains the symmetry of the lens before and after the stop SP in the zooming, thereby achieving the structure to facilitate the correction for distortion, lateral chromatic aberration, etc. necessary for the image scanner. Change in spherical aberration is suppressed by placing at least two lenses on the original surface side with respect to the stop SP in the second unit $L2_1$ through $L2_{10}$. This implements the zoom lens for image scanner that is as bright as the effective F-number (FNo) of about F6 and that has the zoom ratio of 2, in each numerical example.

Further, the zoom lenses of the present invention preferably satisfy each condition equation below in order to keep higher performance.

Specifically, where image magnifications at the shortest focal length of the second and third units $L2_1$ through $L2_{10}$ L3$_1$ through L3$_{10}$ are $\beta_{2w}$, $\beta_{3w}$, respectively, the following conditions are satisfied:

$$0.7 < |\beta_{2w} \times \beta_{3w}| < 1.1 \tag{1}$$

and $$\beta_{2w} \times \beta_{3w} < 0$$

Where phase functions of the first and second diffractive optical elements 11, 12 are defined by the following equation:

$$\phi_j(h) = (2\pi/\lambda) \Sigma C_{i(j)} h^i$$

($\lambda$ is a reference wavelength, h a height from the optic axis, i a degree, and j a number of each diffractive optical element)

and where a focal length at the shortest focal length of the overall system is fw, the following conditions are satisfied:

$$0.0005 < C_{2(1)} \times fw < 0.005 \tag{2}$$

$$0.005 < |C_{2(2)} \times fw| < 0.03 \tag{3}$$

$$(C_{2(2)} < 0)$$

In the conditions, $C_{2(1)}$, $C_{2(2)}$ represent coefficients $C_2$ of the phase functions of the first and second diffractive optical elements 11, 12, respectively.

The condition equation (1) is a condition for restricting the lens diameter on the original surface side to a small level on the short focal length side where the angle of field on the original surface side is large and for suppressing the occurrence of distortion and is effective for maintaining the symmetry of the lens shape before and after the stop SP by keeping the first unit L1$_1$ through L1$_{10}$ from being separated apart from the second unit L2$_1$ through L2$_{10}$ as much as possible.

In the range over the upper limit of condition equation (1), the total magnification of the second and third units L2$_1$ through L2$_{10}$, L3$_1$ through L3$_{10}$ will be large on the high magnification side, so as to increase an aberration variation due to zooming, which is not preferable. In the range below the lower limit of condition equation (1), particularly, the symmetry of the lens system with respect to the stop SP is destroyed, so as to cause the occurrence of distortion and increase in the size of the front lens., which is not preferable.

Condition equations (2), (3) specify appropriate values for the refracting powers of the first and second diffractive optical elements 11, 12. Condition equation (2) is for correcting for a variation in lateral chromatic aberration due to zooming while suppressing asymmetric aberration such as astigmatism or coma. Condition equation (3) is for correcting for a variation in axial chromatic aberration due to zooming while suppressing bending of spherical aberration.

In the range over the upper limits of both condition equations (2), (3) the negative effect appears great on aberration except for chromatic aberration. In the range below the lower limits of condition equations (2), (3) the intrinsic correction effect is weakened, which is not preferable.

The first and second diffractive optical elements 11, 12 in each numerical example are optical elements for refracting or reflecting light according to the law of diffraction:

$$n \sin \theta - n' \sin \theta' = m\lambda/d$$

(n is an index of refraction of a medium on the incidence side, n' an index of refraction of a medium on the emergence side, $\theta$ an angle of incidence of ray, $\theta'$ an angle of emergence of ray, $\lambda$ a wavelength, and d a grating pitch)

Ordinary glasses for refracting optical elements have dispersion represented by the following:

$$\nu = (n-1)/\Delta n;$$

whereas the diffractive optical elements have dispersion represented by the following:

$$\nu = \lambda/\Delta\lambda.$$

Abbe's numbers of the ordinary glasses are approximately 20 to 95 whereas the diffractive optical elements have the constant Abbe's number $\nu = -3.453$. This means that the diffractive optical elements have the negative Abbe's number, while the ordinary glasses have the positive Abbe's numbers. The diffractive optical elements also have a partial dispersion ratio greatly different from those of the ordinary glasses.

In each numerical example, color correction is effectively achieved by making use of such optical characteristics of the diffractive optical element.

This diffractive optical element can be expressed by the following phase equation.

$$\phi(h) = (2\pi/\lambda)(c_1 h^1 + c_2 h^2 + c_3 h^3 + c_4 h^4 + c_5 h^5 \ldots) \tag{4}$$

In the above equation $\phi(h)$ represents the phase, h a distance in the radial direction from the optic axis of lens, and $\lambda$ the reference wavelength. Namely, a diffractive optical element is expressed by adding the phase to the reference surface of lens.

Figure 11:
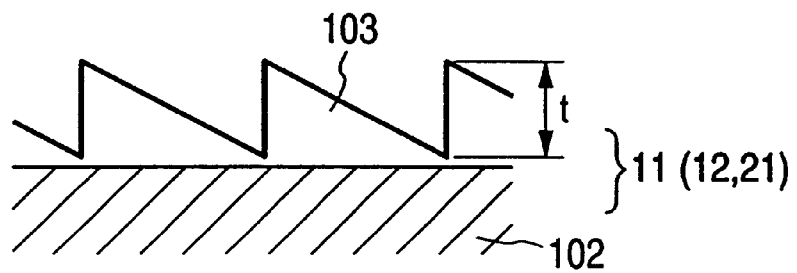
FIG. 11 is an explanatory drawing of a diffractive optical element according to the present invention.

FIG. 11 is an explanatory diagram to show a diffraction grating shape of the diffractive optical element 11 (12) in each numerical example, which is a kinoform shape having a thickness t.

Figure 12:
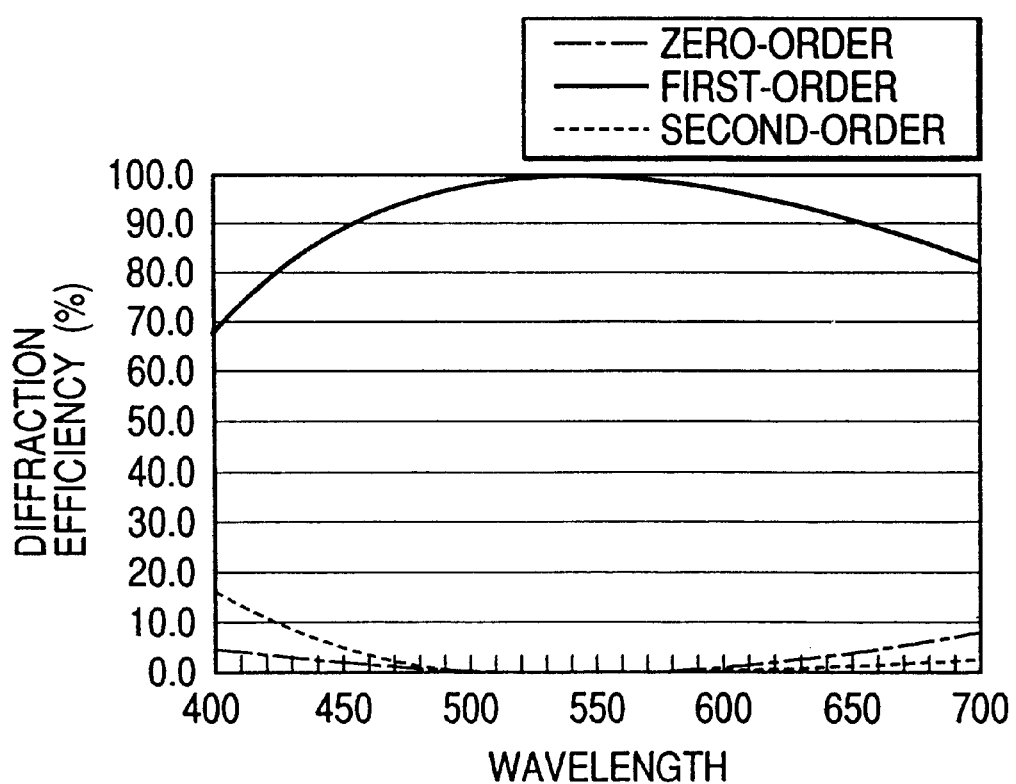
FIG. 12 is an explanatory drawing to show wavelength dependence characteristics of the diffractive optical element according to the present invention.

FIG. 12 is an explanatory diagram to show wavelength dependence characteristics of first-order diffraction efficiency of the diffractive optical element illustrated in FIG. 11. The structure of an actual diffraction grating is formed by coating the surface of a base material (glass substrate) 102 with an ultraviolet-curing resin to form grating 103 having such a grating thickness t that the first-order diffraction efficiency is 100% at the wavelength 530 nm, in the resin portion, as illustrated in FIG. 11. As apparent from FIG. 12, the diffraction efficiency in the designed order decreases as the wavelength becomes more apart from the wavelength 530 nm of the optimized wavelength, while diffracted light of orders near the designed order, i.e., zero-order and second-order diffracted light increases on the other hand. The increase of the diffracted light of the other orders than the designed order results in flare and in turn lowering the resolution of the optical system.

Figure 13:
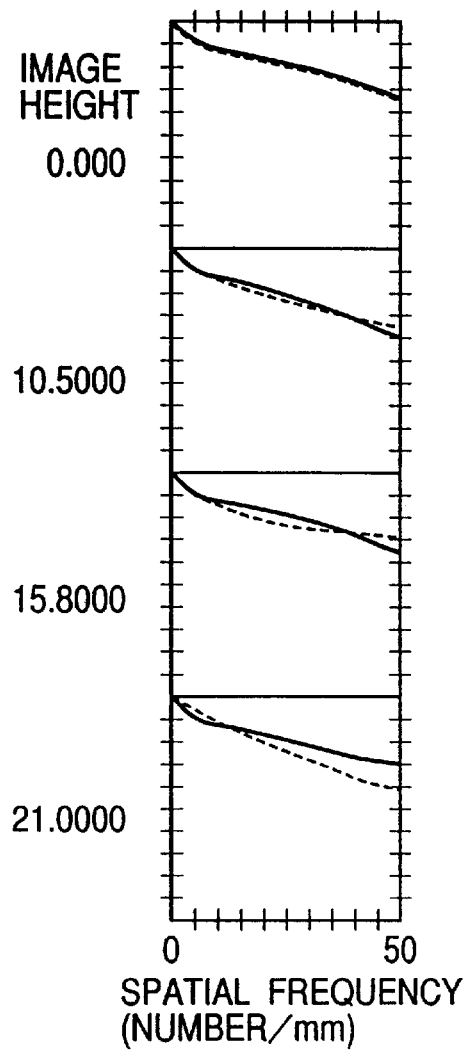
FIG. 13 is an MTF characteristic diagram of the diffractive optical element according to the present invention.

FIG. 13 shows average MTF characteristics in the visible region at the shortest focal length extreme against spatial frequency, where each numerical example described previously is prepared with the grating shape of FIG. 11. It is seen from FIG. 13 that MTF in the low frequency region is lower than desired values.

Figure 14:
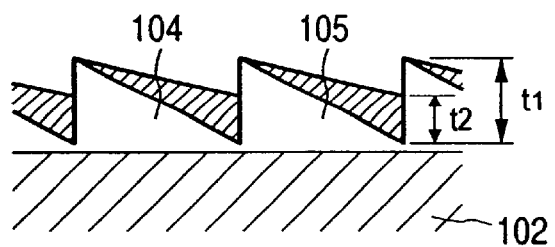
FIG. 14 is an explanatory drawing of another diffractive optical element according to the present invention.

Therefore, each numerical example gains the desired MTF characteristics by employing as a grating shape of the diffractive optical elements a stack type diffraction grating in which plural diffraction gratings 104, 105 are stacked on the base material 102, for example as illustrated in FIG. 14, without having to be limited to the diffraction grating shape illustrated in FIG. 11.

Figure 15:
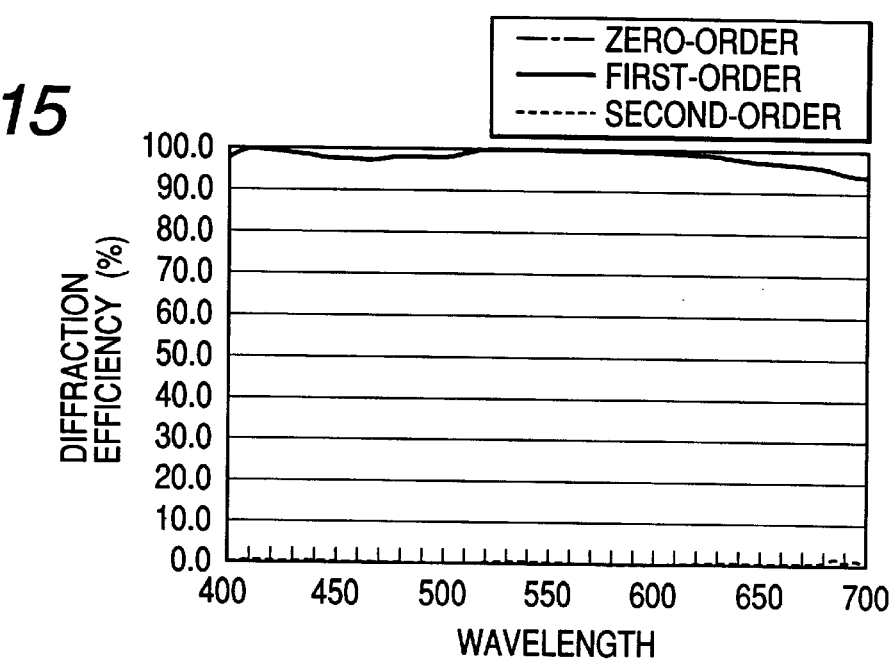
FIG. 15 is an explanatory drawing to show wavelength dependence characteristics of the diffractive optical element according to the present invention.

FIG. 15 is an explanatory diagram to show the wavelength dependence characteristics of first-order diffraction efficiency of the diffractive optical element of this structure. A specific configuration is formed by first forming the first diffraction grating 104 of an ultraviolet-curing resin (nd=1.499, vd=54) on the base material 102 and further forming the second diffraction grating 105 of another ultraviolet-curing resin (nd=1.598, vd=28) thereon, as illustrated in FIG. 14. In this combination of the materials the grating thickness t1 of the first diffraction grating 104 is t1=13.8 $\mu$m and the grating thickness t2 of the second diffraction grating is d2=10.5 $\mu$m. As apparent from FIG. 15, the diffraction grating of the stack structure has high diffraction efficiencies, of the designed order of 95% or more throughout the entire use wavelength region.

Figure 16:
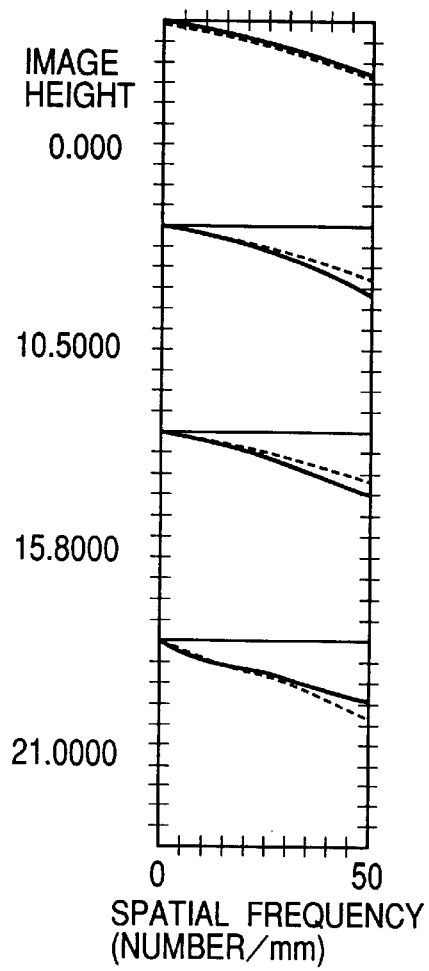
FIG. 16 is an MTF characteristic diagram of the diffractive optical element according to the present invention.

FIG. 16 shows the MTF characteristics against spatial frequency in this case. It is seen from FIG. 16 that use of the diffraction grating of the stack structure improves MTF in the low frequency region and the desired MTF characteristics are obtained. The optical performance is further improved by using the diffraction grating of the stack structure as a diffractive optical element as described above.

Figure 17:
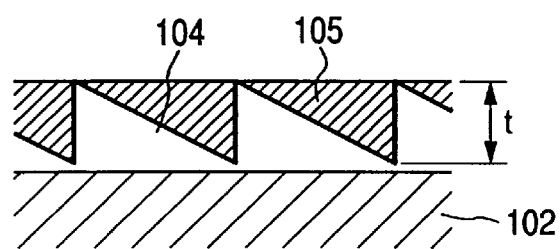
FIG. 17 is an explanatory drawing of another diffractive optical element according to the present invention.

The materials for the diffractive optical element of the above-stated stack structure are not limited to the ultraviolet-curing resins, but other plastic materials can also be used. The first diffraction grating 104 may also be formed directly on the base material, depending upon the base material. The thicknesses of the respective gratings do not always have to be different from each other, but the two diffraction gratings 104, 105 may have respective grating thicknesses equal to each other, depending upon the combination of materials, as illustrated in FIG. 17. In this case, because the grating shape is not formed in the surface of the diffractive optical element, a cheaper optical system can be provided with excellent dustproof capability and with improved assembling operability of the diffractive optical element.

Figure 18:
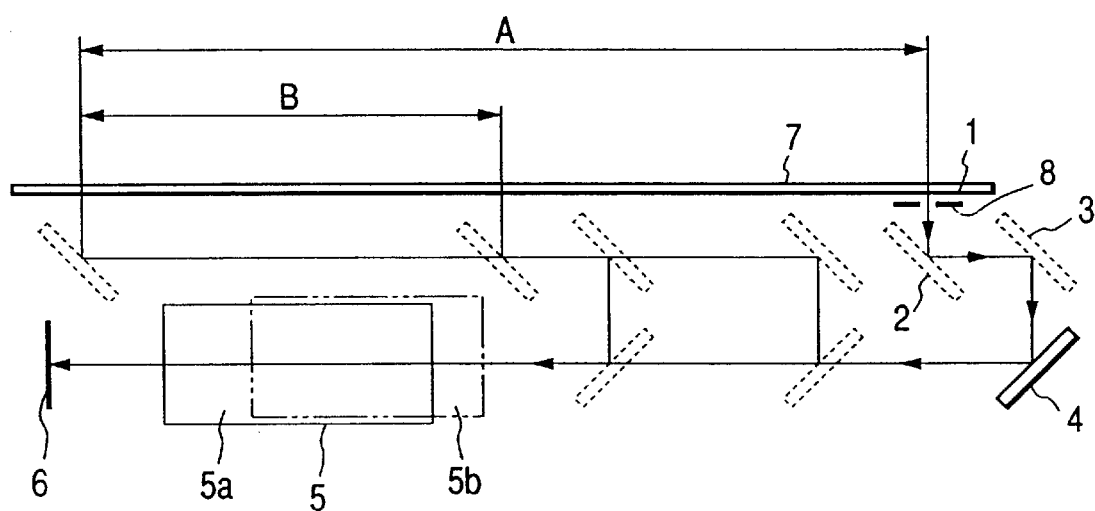
FIG. 18 is a schematic diagram of the major part of an application where the zoom lens of the present invention is applied to an image scanner.

FIG. 18 is a schematic diagram of the major part of an application where the zoom lens of the present invention is applied to an image scanner. In the same figure, reference numeral 1 designates an original glass plate and an original (image) 7 is mounted on the original glass plate 1. Letter A represents the length of the original in the sub-scanning direction. Numeral 8 denotes a slit, which is provided near the surface of the original 7. Numerals 2, 3, 4 represent first, second, and third mirrors, respectively,: which bend a beam based on image information from the original surface to guide it to an imaging means described below. In the present embodiment, a ratio of movement of the first mirror 2 to the mirror unit composed of the second and third mirrors 3, 4 is set to 2:1 in order to keep the optical pathlength constant between the original surface A and a line sensor. 6, described below, during slit scanning. Numeral 5 designates the zoom lens as an imaging means according to the present invention, which is composed of the three lens units as described previously. The zoom lens 5 is fixed during the slit scanning, but moves between position 5a and position 5b during zooming. The slit scanning range with zooming is limited, for example, to the range B. Numeral 6 indicates a line sensor (CCD) as a reading means elongated in the direction normal to the plane of the drawing.

In the present embodiment the light from the original on the original glass plate 1 illuminated by an illuminating means (not illustrated) is focused on the surface of the line sensor 6 via the first, second, third mirrors 2, 3, 4 by the imaging means 5 and the image of the original 7 is read by the line sensor 6.

In the present embodiment, when the original (image) is doubled by zooming and when the reading width of the line sensor (CCD) is constant, the original reading width is half and the slit scanning range is also half. Therefore, the reading dot size on the original surface is half that in the full scan, so that finer image reading can be performed during enlargement.

There arises, however, a problem that the effective F-number on the line sensor side needs to be kept constant where the reading speed of the line sensor is not changed during enlargement. The focal length of the overall system during enlargement becomes longer, so that a brighter F-number is necessary than in the case of the full scan. Further, in the case of the color reading, because the pixel pitch of the line sensor is constant, color deviation on the original surface needs to be suppressed to a low level during enlargement.

As described above, the zoom lenses for image scanner have the problem that the conditions for correction for aberration due to zooming are stricter than in the case of the ordinary zoom lenses, for example, such as the photographic lenses, as described above.

The present embodiment thus solves the above problem and assures the desired zoom performance by composing the zoom lens 5 of the three lens units, properly setting the lens configuration of each lens unit, and properly placing the diffractive optical elements in the first unit and in the second unit as described previously.

Numerical Examples 1 to 5 of the present invention will be detailed below.

In Numerical Examples 1 to 5, ri represents a radius of curvature of the ith lens surface when counted from the original surface side, di represents the ith lens thickness or air space when counted from the original surface side, and ni and vi represent a refractive index and an Abbe's number, respectively, of glass of the ith lens when counted from the original surface side. Coefficients of the phase equation will be given for the diffractive optical elements.

The relationship between the condition equations described previously and various numerals in the respective numerical examples will be given in Table 1.

Numerical Example 1 f = 50.34 to 78.00    effective fno = 1:6.08
image magnification = −0.19 to −0.38

(first unit: r1 to r6)

| | | |
|---|---|---|
| r1 = 61.010 | d1 = 1.80 n1 = 1.77621 | v1 = 49.6 |
| r2 = 27.970 | d2 = 10.80 | |
| *r3 = −51.861 | d3 = 1.80 n2 = 1.51825 | v2 = 64.2 |
| r4 = −121.884 | d4 = 0.20 | |
| r5 = 41.524 | d5 = 2.85 n3 = 1.85504 | v3 = 23.8 |
| r6 = 58.039 | d6 = variable | |

(second unit: r7 to r17)

| | | |
|---|---|---|
| r7 = 45.902 | d7 = 3.87 n4 = 1.77621 | v4 = 49.6 |
| r8 = −256.077 | d8 = 0.20 | |
| r9 = 42.928 | d9 = 5.60 n5 = 1.77621 | v5 = 49.6 |
| r10 = −200.988 | d10 = 0.36 | |
| r11 = −133.992 | d11 = 6.50 n6 = 1.79192 | v6 = 25.7 |
| *r12 = 56.609 | d12 = 5.03 | |
| r13 = 0.000 (stop) | d13 = 11.45 | |
| r14 = −23.560 | d14 = 1.80 n7 = 1.72734 | v7 = 29.2 |
| r15 = 47.507 | d15 = 0.26 | |
| r16 = 36.993 | d16 = 4.74 n8 = 1.53430 | v8 = 48.9 |
| r17 = −31.168 | d17 = variable | |

(third unit: r18 to r21)

| | | |
|---|---|---|
| r18 = 123.573 | d18 = 3.35 n9 = 1.76168 | v9 = 27.5 |
| r19 = −52.131 | d19 = 6.36 | |

-continued

| | | | |
|---|---|---|---|
| r20 = −19.780 | d20 = 1.80 | n10 = 1.71615 | ν10 = 53.8 |
| r21 = −31.384 | d21 = variable | | |
| (glass cover: r22 and r23) | | | |
| r22 = 0.000 | d22 = 0.70 | n11 = 1.51825 | ν11 = 64.2 |
| r23 = 0.000 (image plane) | | | |

| Focal length | 50.34 | 78.00 | 64.16 |
|---|---|---|---|
| Variable distances | | | |
| d6 | 23.05 | 0.80 | 9.40 |
| d17 | 5.28 | 3.44 | 3.98 |
| d21 | 35.20 | 73.29 | 52.08 |

[Phase coefficients] (The diffraction grating elements are attached to the surfaces accompanied with asterisk)

(r3 surface)

| $c_2$ | $c_3$ | $c_4$ |
|---|---|---|
| 3.24210D−05 | 0.00000D+00 | −1.05560D−07 |
| $c_5$ | $c_6$ | |
| 0.00000D+00 | 1.34850D−10 | |

(r12 surface)

| $c_2$ | $c_3$ | $c_4$ |
|---|---|---|
| −2.24304D−04 | 0.00000D+00 | −2.49290D−08 |
| $c_5$ | $c_6$ | |
| 0.00000D+00 | −2.65880D−09 | | object-image distance: 406.98

Focal lengths of the respective lens units

| first unit $L1_1$–$L1_5$ | −70.45 |
|---|---|
| second unit $L2_1$–$L2_5$ | 48.10 |
| third unit $L3_1$–$L3_3$ | 106.64 |

Numerical Example 2 f = 49.35 to 76.32   effective fno = 1:6.08
image magnification = −0.19 to −0.38

(first unit: r1 to r8)

| r1 = 138.856 | d1 = 1.80 | n1 = 1.77621 | ν1 = 49.6 |
|---|---|---|---|
| r2 = 35.860 | d2 = 4.75 | | |
| r3 = −138.612 | d3 = 4.00 | n2 = 1.72056 | ν2 = 47.9 |
| r4 = −44.829 | d4 = 5.22 | | |
| *r5 = −41.149 | d5 = 1.80 | n3 = 1.76077 | ν3 = 47.8 |
| r6 = −452.465 | d6 = 0.20 | | |
| r7 = 58.126 | d7 = 3.50 | n4 = 1.81265 | ν4 = 25.4 |
| r8 = 145.711 | d8 = variable | | |

(second unit: r9 to r17)

| r9 = 37.008 | d9 = 4.50 | n5 = 1.69401 | ν5 = 54.8 |
|---|---|---|---|
| r10 = −136.802 | d10 = 0.20 | | |
| r11 = 36.330 | d11 = 7.09 | n6 = 1.70042 | ν6 = 48.5 |
| *r12 = 49.800 | d12 = 3.83 | | |
| r13 = 0.000 (stop) | d13 = 1.26 | | |
| r14 = −44.966 | d14 = 1.70 | n7 = 1.79177 | ν7 = 26.2 |
| r15 = 29.367 | d15 = 3.24 | | |
| r16 = 30.872 | d16 = 4.60 | n8 = 1.56605 | ν8 = 60.7 |
| r17 = −61.770 | d17 = variable | | |

(third unit: r18 to r21)

| r18 = 188.040 | d18 = 4.50 | n9 = 1.81265 | ν9 = 25.4 |
|---|---|---|---|
| r19 = −82.844 | d19 = 11.16 | | |
| r20 = −18.407 | d20 = 1.80 | n10 = 1.80811 | ν10 = 46.6 |
| r21 = −28.239 | d21 = variable | | |

(glass cover: r22 and r23)

| r22 = 0.000 | d22 = 0.70 | n11 = 1.51825 | ν11 = 64.2 |
|---|---|---|---|
| r23 = 0.000 (image plane) | | | |

-continued

| Focal length | 49.35 | 76.32 | 63.06 |
|---|---|---|---|
| Variable distances | | | |
| d8 | 24.50 | 0.75 | 9.87 |
| d17 | 10.65 | 10.03 | 10.17 |
| d21 | 35.30 | 70.23 | 50.78 |

[Phase coefficients] (The diffraction grating elements are attached to the surfaces accompanied with asterisk)

(r5 surface)

| $c_1$ | $c_2$ | $c_3$ |
|---|---|---|
| 0.00000D+00 | 6.03500D−05 | 0.00000D+00 |
| $c_4$ | $c_5$ | $c_6$ |
| 1.68371D−08 | 0.00000D+00 | 2.75860D−10 |
| $c_8$ | $c_9$ | $c_{10}$ |
| −3.12051D−12 | 0.00000D+00 | 5.44567D−15 |
| $c_{11}$ | $c_{12}$ | $c_{13}$ |
| 0.00000D+00 | 0.00000D+00 | 0.00000D+00 |

(r12 surface)

| $c_2$ | $c_3$ | $c_4$ |
|---|---|---|
| −2.02168D−04 | 4.12204D−06 | −1.53314D−06 |
| $c_5$ | $c_6$ | |
| 2.60950D−07 | −1.33349D−08 | |

Object-image distance: 406.98

Focal lengths of the respective lens units

| first unit $L1_1$–$L1_5$ | −77.15 |
|---|---|
| second unit $L2_1$–$L2_5$ | 50.06 |
| third unit $L3_1$–$L3_3$ | 515.88 |

Numerical Example 3 f = 49.93 to 76.91   effective fno = 1:6.08
image magnification = −0.19 to −0.38

(first unit: r1 to r8)

| r1 = 80.527 | d1 = 1.80 | n1 = 1.80401 | ν1 = 42.2 |
|---|---|---|---|
| r2 = 30.944 | d2 = 4.99 | | |
| r3 = −93.441 | d3 = 3.06 | n2 = 1.64129 | ν2 = 55.4 |
| r4 = −40.489 | d4 = 4.22 | | |
| *r5 = −36.649 | d5 = 1.80 | n3 = 1.72341 | ν3 = 50.3 |
| r6 = −8467.623 | d6 = 0.20 | | |
| r7 = 61.644 | d7 = 2.83 | n4 = 1.85504 | ν4 = 23.8 |
| r8 = 298.165 | d8 = variable | | |

(second unit: r9 to r19)

| r9 = 50.087 | d9 = 3.84 | n5 = 1.77621 | ν5 = 49.6 |
|---|---|---|---|
| r10 = −189.493 | d10 = 0.20 | | |
| r11 = 41.058 | d11 = 6.19 | n6 = 1.77621 | ν6 = 49.6 |
| r12 = −664.409 | d12 = 0.21 | | |
| r13 = −556.861 | d13 = 4.80 | n7 = 1.74706 | ν7 = 27.8 |
| *r14 = 71.243 | d14 = 5.43 | | |
| r15 = 0.000 (stop) | d15 = 0.98 | | |
| r16 = −44.237 | d16 = 1.80 | n8 = 1.74706 | ν8 = 27.8 |
| r17 = 30.381 | d17 = 2.35 | | |
| r18 = 30.211 | d18 = 3.91 | n9 = 1.48915 | ν9 = 70.2 |
| r19 = −54.449 | d19 = variable | | |

(third unit: r20 to r23)

| r20 = 141.890 | d20 = 2.70 | n10 = 1.76859 | ν10 = 26.5 |
|---|---|---|---|
| r21 = −76.043 | d21 = 11.92 | | |
| r22 = −18.736 | d22 = 1.80 | n11 = 1.77621 | ν11 = 49.6 |
| r23 = −27.087 | d23 = variable | | |

(glass cover: r24 and r25)

| r24 = 0.000 | d24 = 0.70 | n12 = 1.51825 | ν12 = 64.2 |
|---|---|---|---|
| r25 = 0.000 (image plane) | | | |

-continued

| Focal length Variable distances | 49.93 | 76.91 | 63.59 |
|---|---|---|---|
| d8 | 19.95 | 0.58 | 8.04 |
| d19 | 9.96 | 8.63 | 9.00 |
| d23 | 35.17 | 72.16 | 51.69 |

[Phase coefficients] (The diffraction grating elements are attached to the surfaces accompanied with asterisk)

(r5 surface)

| $c_1$ | $c_2$ | $c_3$ |
|---|---|---|
| 0.00000D+00 | 4.63645D−05 | 0.00000D+00 |
| $c_4$ | $c_5$ | $c_6$ |
| 2.94554D−08 | 0.00000D+00 | −3.62557D−10 |

(r14 surface)

| $c_2$ | $c_3$ | $c_4$ |
|---|---|---|
| −2.07007D−04 | 0.00000D+00 | −2.53629D−09 |
| $c_5$ | $c_6$ | |
| 0.00000D+00 | −1.43772D−09 | |

Object-image distance: 406.98

Focal lengths of the respective lens units

| first unit $L1_1$–$L1_5$ | −66.46 |
|---|---|
| second unit $L2_1$–$L2_5$ | 48.25 |
| third unit $L3_1$–$L3_3$ | 177.08 |

Numerical Example 4 f = 50.78 to 78.32  effective fno = 1:6.08
image magnification = −0.19 to −0.38

(first unit: r1 to r6)

| r1 = | 62.826 | d1 = | 1.80 | n1 = 1.77621 | v1 = 49.6 |
|---|---|---|---|---|---|
| r2 = | 27.118 | d2 = | 11.01 | | |
| *r3 = | −51.803 | d3 = | 1.80 | n2 = 1.48915 | v2 = 70.2 |
| r4 = | −121.989 | d4 = | 0.20 | | |
| r5 = | 39.695 | d5 = | 2.38 | n3 = 1.85501 | v3 = 23.9 |
| r6 = | 55.134 | d6 = | variable | | |

(second unit: r7 to r15)

| r7 = | 42.216 | d7 = | 6.50 | n4 = 1.71615 | v4 = 53.8 |
|---|---|---|---|---|---|
| r8 = | −239.786 | d8 = | 1.20 | | |
| r9 = | 40.824 | d9 = | 6.50 | n5 = 1.79013 | v5 = 44.2 |
| r10 = | −125.619 | d10 = | 0.92 | | |
| r11 = | −78.064 | d11 = | 6.50 | n6 = 1.85501 | v6 = 23.9 |
| *r12 = | 52.640 | d12 = | 2.99 | | |
| r13 = | 0.000 (stop) | d13 = | 19.68 | | |
| r14 = | −16.504 | d14 = | 1.80 | n7 = 1.85501 | v7 = 23.9 |
| r15 = | −20.884 | d15 = | variable | | |

(third unit: r16 to r19)

| r16 = | 1055.277 | d16 = | 3.46 | n8 = 1.75453 | v8 = 35.3 |
|---|---|---|---|---|---|
| r17 = | −42.724 | d17 = | 1.76 | | |
| r18 = | −24.627 | d18 = | 1.80 | n9 = 1.71615 | v9 = 53.8 |
| r19 = | −35.894 | d19 = | variable | | |

(glass cover: r20 and r21)

| r20 = | 0.000 | d20 = | 0.70 | n10 = 1.51825 | v10 = 64.2 |
|---|---|---|---|---|---|
| r21 = | 0.000 (image plane) | | | | |

| Focal length Variable distance | 50.51 | 78.32 | 64.37 |
|---|---|---|---|
| d6 | 23.57 | 0.80 | 9.29 |
| d15 | 5.11 | 0.80 | 1.64 |
| d19 | 35.24 | 76.68 | 54.53 |

[Phase coefficients] (The diffraction grating elements are attached to the surfaces accompanied with asterisk)

(r3 surface)

| $c_2$ | $c_3$ | $c_4$ |
|---|---|---|
| 1.53310D−05 | 0.00000D+00 | −6.99030D−08 |
| $c_5$ | $c_6$ | |
| 0.00000D+00 | 1.26980D−10 | |

(r12 surface)

| $c_2$ | $c_3$ | $c_4$ |
|---|---|---|
| −2.21370D−04 | 0.00000D+00 | 7.08610D−08 |
| $c_5$ | $c_6$ | |
| 0.00000D+00 | −3.72960D−09 | |

Object-image distance: 406.98

Focal lengths of the respective lens units

| first unit $L1_1$–$L1_5$ | −67.48 |
|---|---|
| second unit $L2_1$–$L2_5$ | 43.65 |
| third unit $L3_1$–$L3_3$ | 102.72 |

Numerical Example 5 f = 50.48 to 78.36  effective fno = 1:6.08
image magnification = −0.19 to −0.38

(first unit: r1 to r6)

| r1 = | 67.152 | d1 = | 1.80 | n1 = 1.77621 | v1 = 49.6 |
|---|---|---|---|---|---|
| r2 = | 27.182 | d2 = | 10.52 | | |
| *r3 = | −63.238 | d3 = | 1.80 | n2 = 1.48915 | v2 = 70.2 |
| r4 = | −280.538 | d4 = | 0.20 | | |
| r5 = | 40.330 | d5 = | 2.57 | n3 = 1.81265 | v3 = 25.4 |
| r6 = | 62.204 | d6 = | variable | | |

(second unit: r7 to r12)

| r7 = | 49.768 | d7 = | 4.32 | n4 = 1.77621 | v4 = 49.6 |
|---|---|---|---|---|---|
| r8 = | −119.276 | d8 = | 2.16 | | |
| r9 = | 30.911 | d9 = | 6.50 | n5 = 1.64268 | v5 = 44.9 |
| r10 = | −173.239 | d10 = | 0.46 | | |
| r11 = | −96.897 | d11 = | 6.50 | n6 = 1.85501 | v6 = 23.9 |
| *r12 = | 35.185 | d12 = | 3.77 | | |
| r13 = | 0.000 (stop) | d13 = | variable | | |

(third unit: r14 to r19)

| r14 = | −14.944 | d14 = | 1.80 | n7 = 1.65223 | v7 = 33.8 |
|---|---|---|---|---|---|
| r15 = | −18.243 | d15 = | 0.20 | | |
| r16 = | 197.384 | d16 = | 4.28 | n8 = 1.67766 | v8 = 32.1 |
| r17 = | −33.142 | d17 = | 4.16 | | |
| r18 = | −27.387 | d18 = | 1.80 | n9 = 1.74706 | v9 = 27.8 |
| r19 = | −56.343 | d19 = | variable | | |

(glass cover: r20 and r21)

| r20 = | 0.000 | d20 = | 0.70 | n10 = 1.51825 | v10 = 64.2 |
|---|---|---|---|---|---|
| r21 = | 0.000 (image plane) | | | | |

| Focal length Variable distances | 50.48 | 78.36 | 64.36 |
|---|---|---|---|
| d6 | 22.23 | 0.80 | 9.05 |
| d13 | 22.17 | 18.99 | 19.75 |
| d19 | 35.20 | 76.68 | 54.19 |

[Phase coefficients] (The diffraction grating elements are attached to the surfaces accompanied with asterisk)

(r3 surface)

| $c_2$ | $c_3$ | $c_4$ |
|---|---|---|
| 3.64050D−05 | 0.00000D+00 | −9.19710D−08 |
| $c_5$ | $c_6$ | |
| 0.00000D+00 | −7.75180D−11 | |

-continued (r12 surface)

| c2 | c3 | c4 |
|---|---|---|
| −2.62730D−04 | 0.00000D+00 | 3.45210D−07 |
| c5 | c6 | |
| 0.00000D+00 | −6.45240D−09 | |

Object-image distance: 406.98

Focal lengths of the respective lens units

| first unit $L1_1$–$L1_5$ | −66.01 |
|---|---|
| second unit $L2_1$—$L2_5$ | 43.75 |
| third unit $L3_1$–$L3_3$ | 185.06 |

TABLE 1

| Condition | Numerical Examples | | | | |
|---|---|---|---|---|---|
| equations | 1 | 2 | 3 | 4 | 5 |
| (1) $\beta_{2w} \cdot \beta_{3w}$ | −0.93 | −0.86 | −0.98 | −0.96 | −0.98 |
| (2) $C_{2(1)}fw$ | 0.0016 | 0.0030 | 0.0023 | 0.0008 | 0.0018 |
| (3) $C_{2(2)}fw$ | −0.0113 | −0.0100 | −0.0103 | −0.0112 | −0.0133 |

The pitch and depth of the diffractive optical elements in each numerical example are both in an adequately manufacturable range. For example, in Numerical Example 1, where the diffractive optical elements are produced in the single-layer structure, the minimum pitch is about 600 μm for the first unit and about 100 μm for the second unit and the depth is 0.83 μm, which are of the adequately manufacturable level.

The present invention can realize the zoom lenses ready for color reading and the image scanner using the zoom lens with the high zooming ratio of about 2.0 and with the high optical performance throughout the entire zooming range, by properly setting the lens configuration of each lens unit of the three-unit zoom lens and providing the first unit and the second unit each with the diffractive optical element as described above.

Further examples of the present invention will be described below.

FIGS. 19 to 23 are sectional views of respective lenses in Numerical Example 6 to Numerical Example 10 of the present invention, respectively, as will be described below and FIGS. 24A and 24B to FIGS. 28A and 28B are aberration diagrams of Numerical Examples 6 to 10 of the present invention, respectively, as will be described below. Among the aberration diagrams FIGS. 24A, 25A, 26A, 27A, and 28A show aberrations at the shortest focal length extreme and FIGS. 24B, 25B, 26B, 27B, and 28B show aberrations at the longest focal length extreme. Each numerical example represents a numerical example of a zoom lens used in the image scanner.

In the figures, $L1_6$ through $L1_{10}$ represents the first unit having the negative refracting power. $L2_6$ through $L2_{10}$ indicates the second unit having the positive refracting power and the diffractive optical element 21 for correcting variation in axial chromatic aberration due to zooming is provided in the second unit $L2_6$ through $L2_{10}$. In the present invention the diffractive optical element 21 is attached to a refracting surface of a (2-1) negative lens L12C forming the second unit $L2_6$ through $L2_{10}$. SP denotes a stop which is located in the second unit $L2_6$ through $L2_{10}$ and which is moved in unison with the second unit $L2_6$ through $L2_{10}$ during the zooming in the present invention. The diffractive optical element 21 is placed near the stop SP. $L3_6$ through $L3_{10}$ indicates the third unit having the positive refracting power. Letter G designates a glass cover comprised of a plane-parallel plate for the line sensor (not illustrated), which is disposed near the image surface. In the present invention an aspherical surface is provided in at least one lens unit out of the three lens units of the first, second, and third units.

Figure 19:
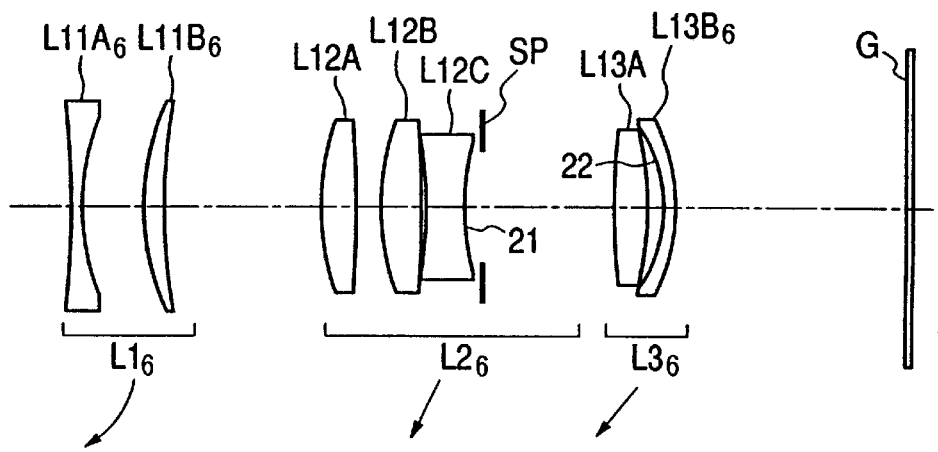
FIG. 19 is a sectional view of a lens in Numerical Example 6 of the present invention.

In Numerical Example 6 of FIG. 19, in order from the original surface side, the first unit $L1_6$ is constructed in a two-lens configuration composed of a (1-1) negative lens $L11A_6$ and a (1-1) positive lens $L11B_6$, the second unit $L2_6$ is constructed in a three-lens configuration composed of a (2-1) positive lens L12A, a (2-2) positive lens L12B, and a (2-1) negative lens L12C, the third unit $L3_6$ is constructed in a two-lens configuration composed of a (3-1) positive lens L13A and a (3-1) negative lens $L13B_6$, the diffractive optical element 21 is attached to a lens surface on the image surface side of the (2-1) negative lens L12C of the second unit $L2_6$, the stop SP is placed in the second unit $L2_6$, and the aspherical surface 22 is formed in a lens surface on the image surface side of the (3-1) positive lens L13A of the third unit.

Figure 20:
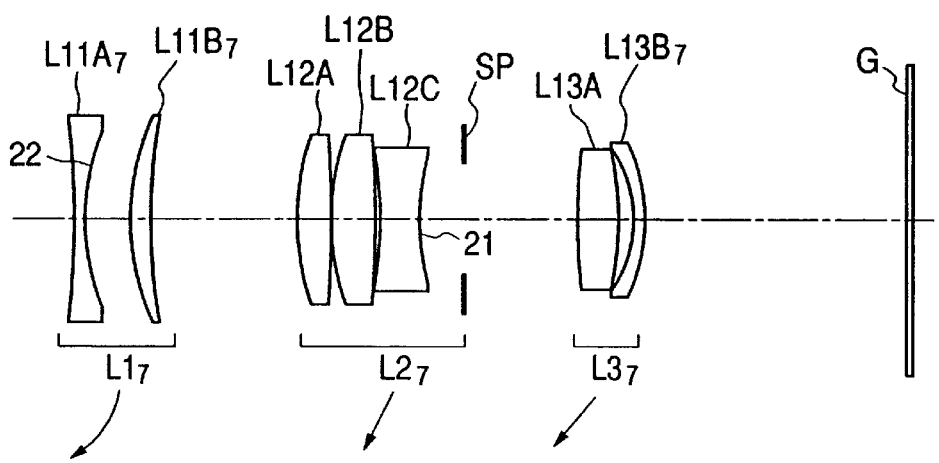
FIG. 20 is a sectional view of a lens in Numerical Example 7 of the present invention.

In Numerical Example 7 of FIG. 20, in order from the original surface side, the first unit $L1_7$ is constructed in a two-lens configuration composed of a (1-1) negative lens $L11A_7$ and a (1-1) positive lens $L11B_7$, the second unit $L2_7$ is constructed in a three-lens configuration composed of a (2-1) positive lens L12A, a (2-2) positive lens L12B, and a (2-1) negative lens L12C, the third unit $L3_7$ is constructed in a two-lens configuration composed of a (3-1) positive lens L13A and a (3-1) negative lens $L13B_7$, the diffractive optical element 21 is attached to a lens surface on the image surface side of the (2-1) negative lens L12C of the second unit $L2_7$, the stop SP is placed in the second unit $L2_7$, and the aspherical surface 22 is formed in a lens surface on the image surface side of the (1-1) negative lens $L11A_7$ of the first unit.

Figure 21:
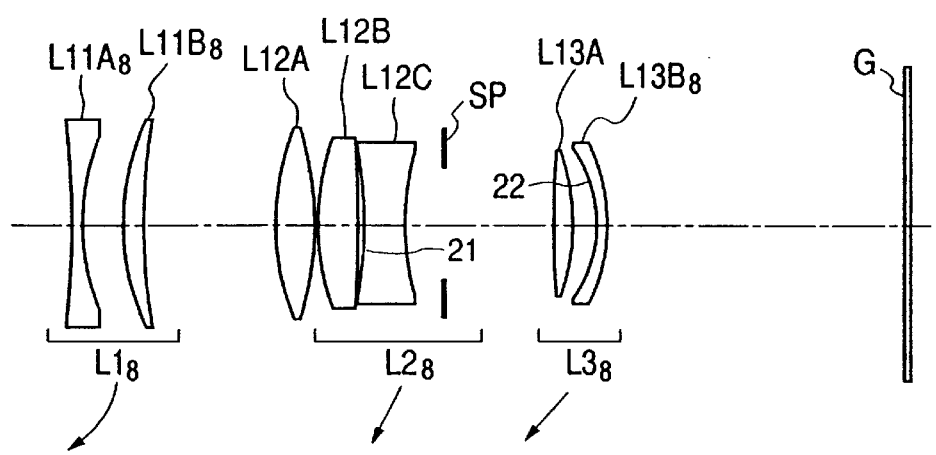
FIG. 21 is a sectional view of a lens in Numerical Example 8 of the present invention.

In Numerical Example 8 of FIG. 21, in order from the original surface side, the first unit $L1_8$ is constructed in a two-lens configuration composed of a (1-1) negative lens $L11A_8$ and a (1-1) positive lens L11B, the second unit $L2_8$ is constructed in a three-lens configuration composed of a (2-1) positive lens L12A, a (2-2) positive lens L12B, and a (2-1) negative lens L12C, the third unit $L3_8$ is constructed in a two-lens configuration composed of a (3-1) positive lens L13A and a (3-1) negative lens $L13B_8$, the diffractive optical element 21 is attached to a lens surface on the original surface side of the (2-1) negative lens L12C of the second unit $L2_8$, the stop SP is placed in the second unit $L2_8$, and the aspherical surface 22 is formed in a lens surface on the original surface side of the (3-1) negative lens $L13B_8$ of the third unit.

Figure 22:
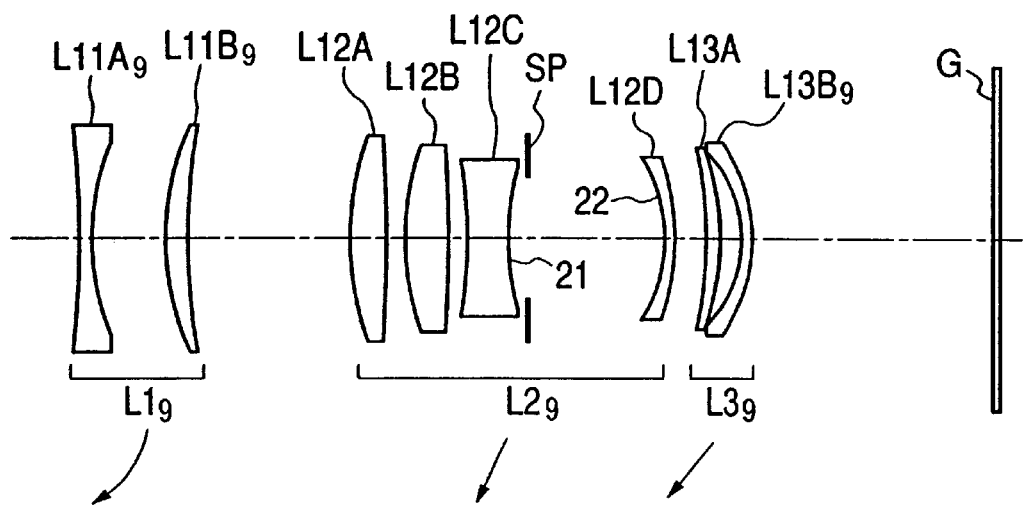
FIG. 22 is a sectional view of a lens in Numerical Example 9 of the present invention.

In Numerical Example 9 of FIG. 22, in order from the original surface side, the first unit $L1_9$ is constructed in a two-lens configuration composed of a (1-1) negative lens $L11A_9$ and a (1-1) positive lens $L11B_9$, the second unit $L2_9$ is constructed in a four-lens configuration composed of a (2-1) positive lens L12A, a (2-2) positive lens L12B, a (2-1) negative lens L12C, and a (2-2) negative lens L12D, the third unit $L3_9$ is constructed in a two-lens configuration composed of a (3-1) positive lens L13A and a (3-1) negative lens $L13B_9$, the diffractive optical element 21 is attached to a lens surface on the image surface side of the (2-1) negative lens L12C of the second unit $L2_9$, the stop SP is placed in the second unit $L2_9$, and the aspherical surface 22 is formed in a lens surface on the original surface side of the (2-2) negative lens L12D of the second unit.

Figure 23:
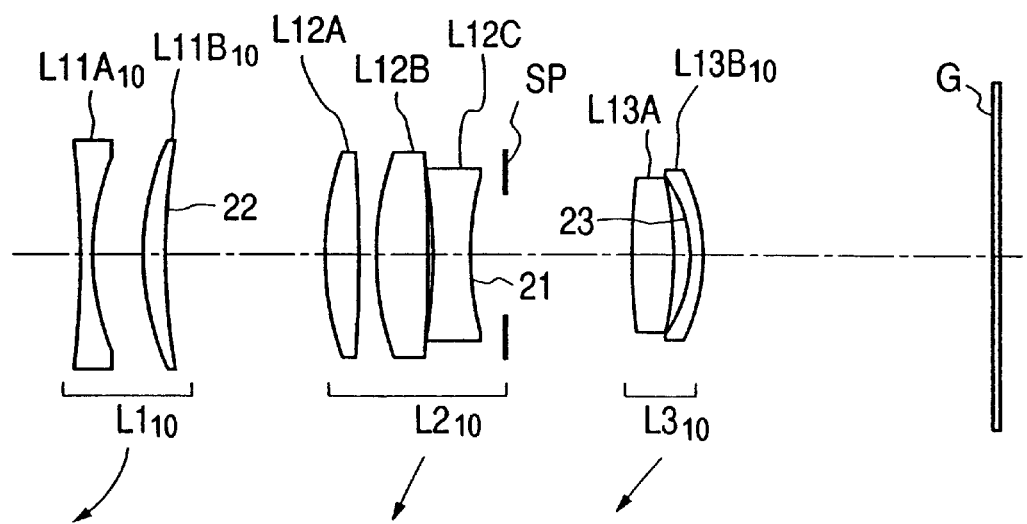
FIG. 23 is a sectional view of a lens in Numerical Example 10 of the present invention.
Figure 24A:
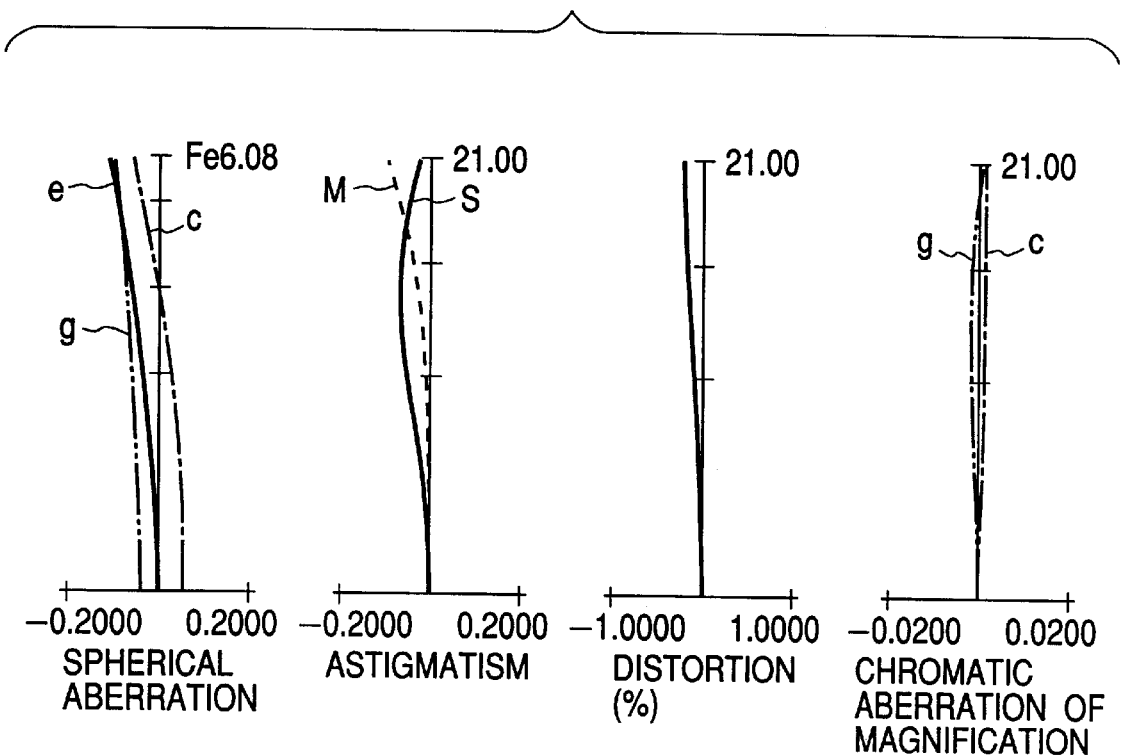
Figure 24B:
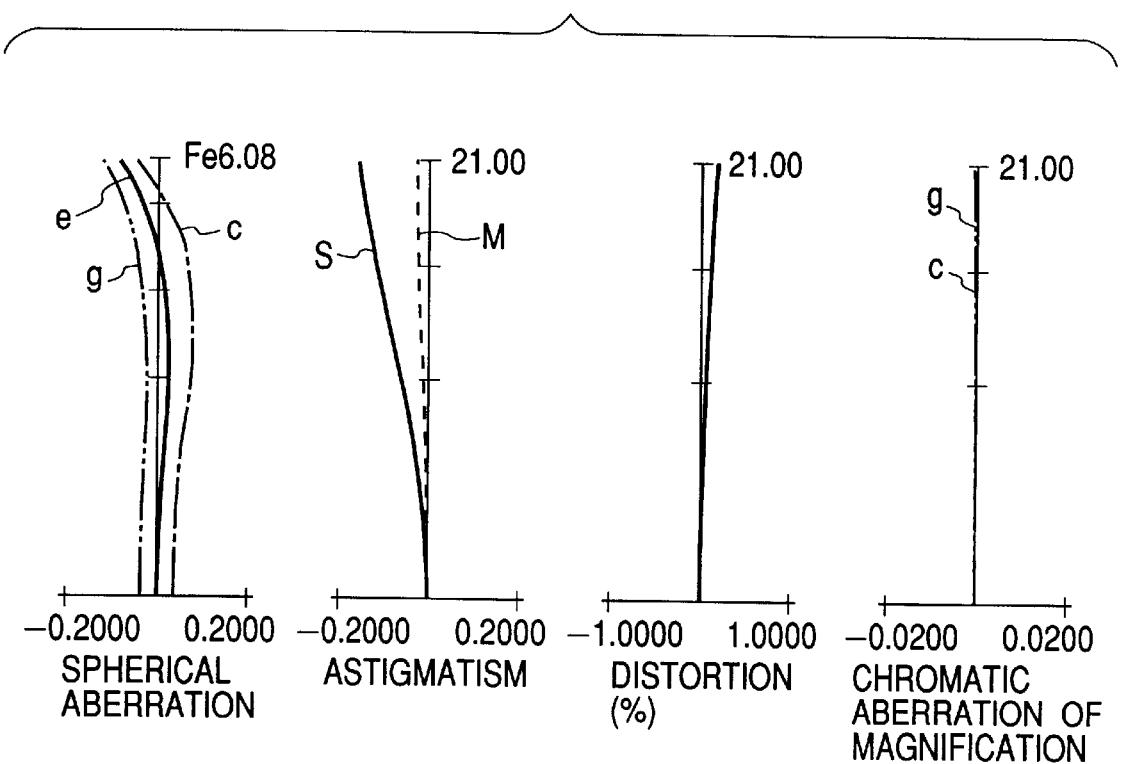
Figure 25A:
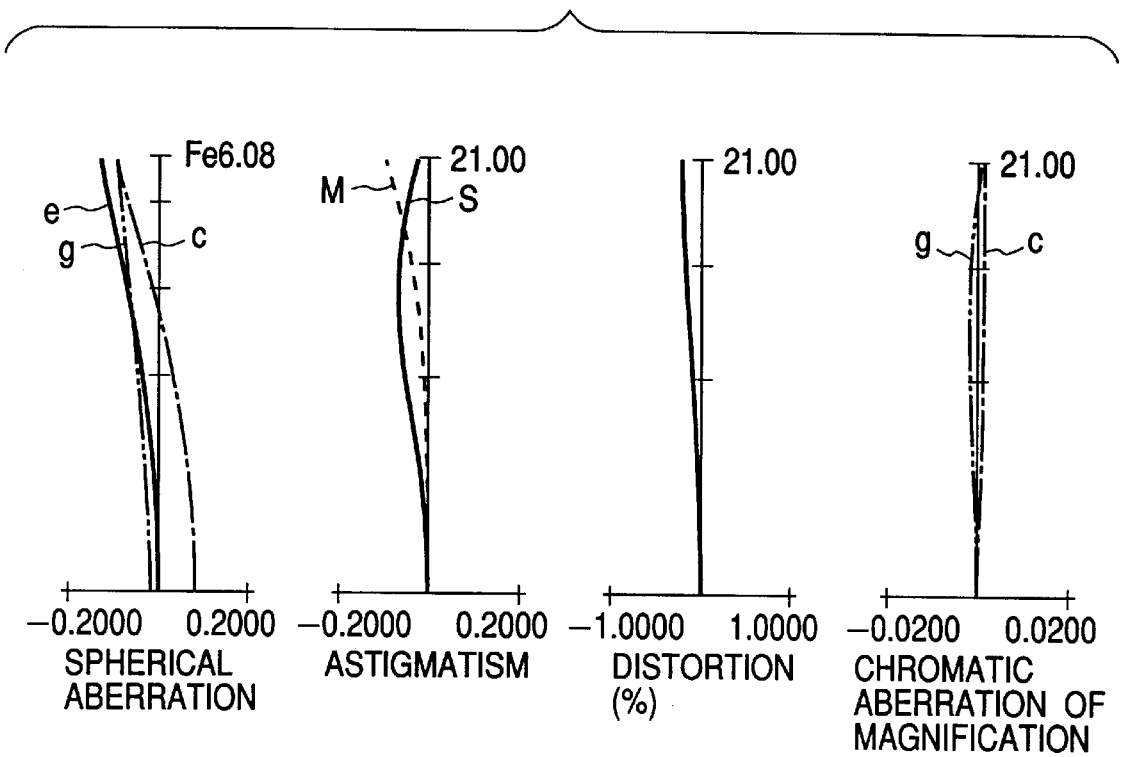
Figure 25B:
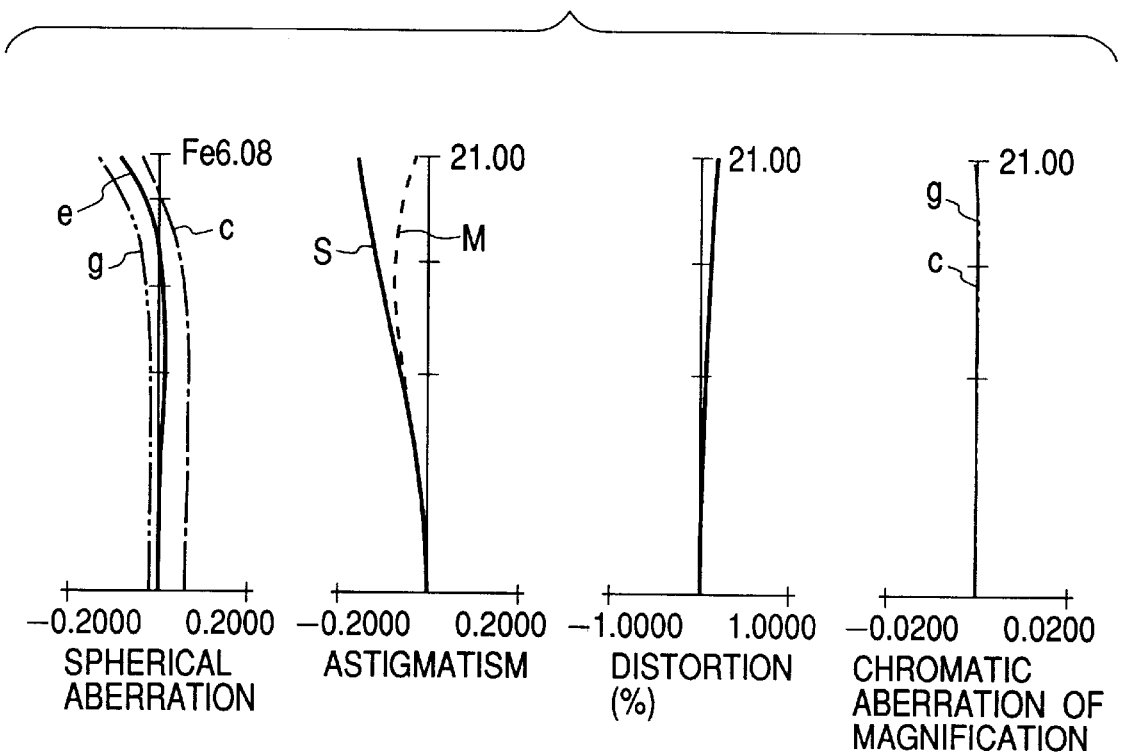
Figure 26A:
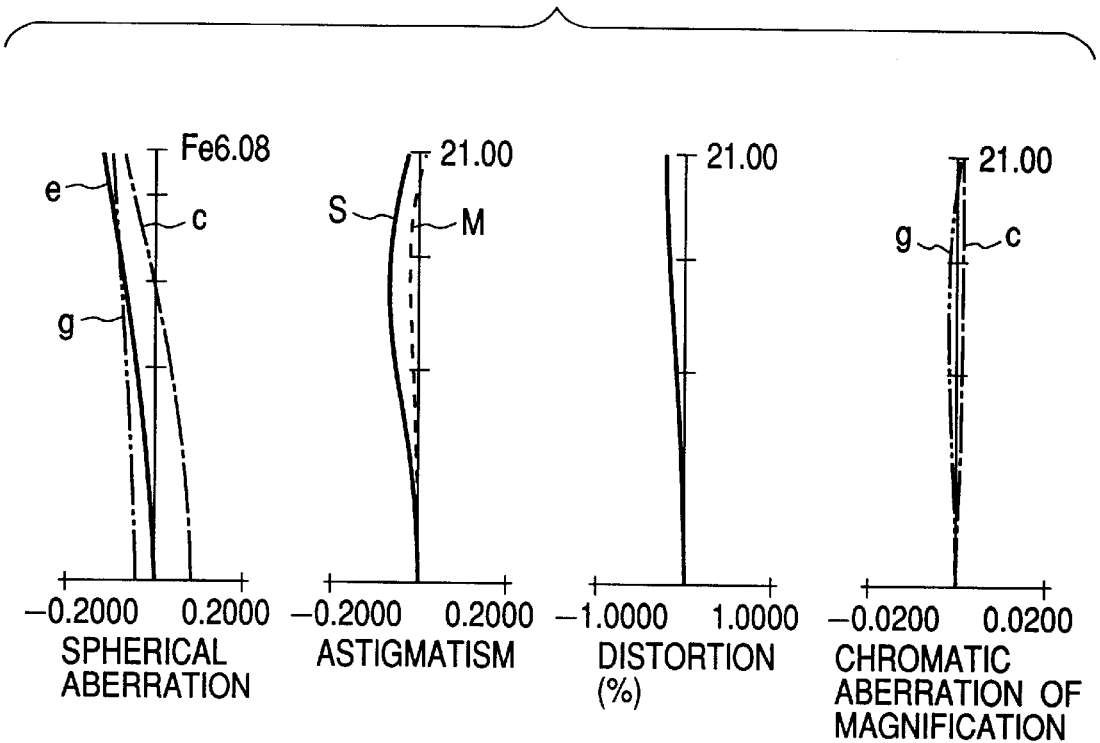
Figure 26B:
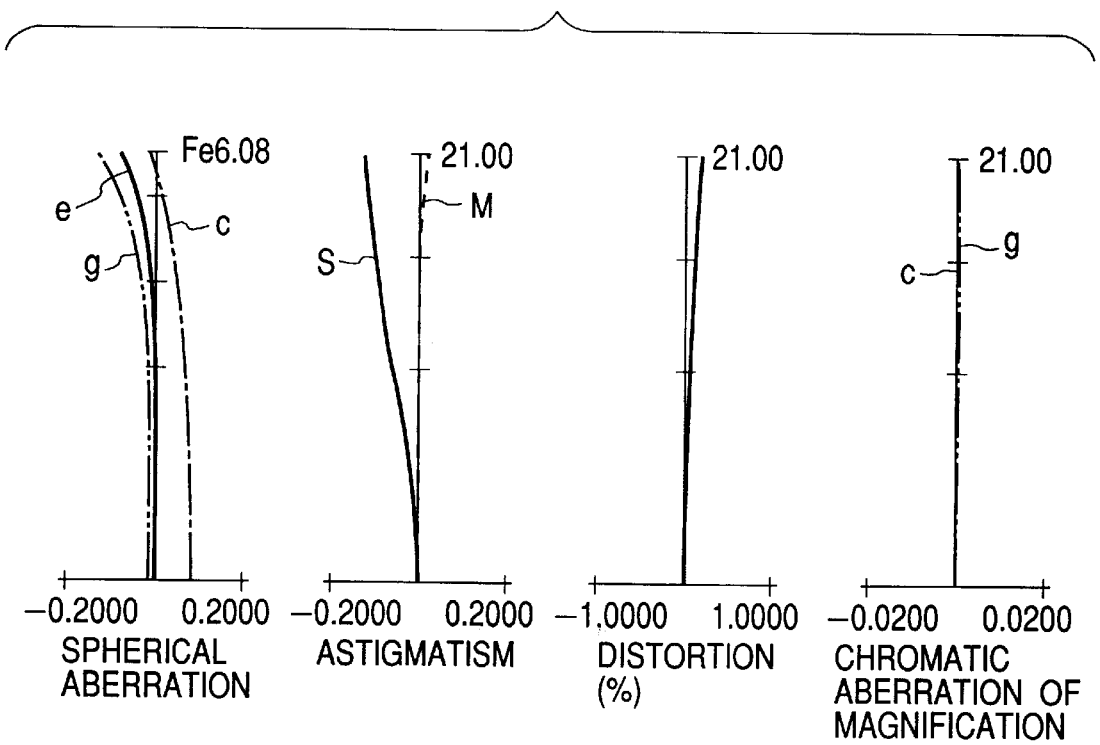
Figure 27A:
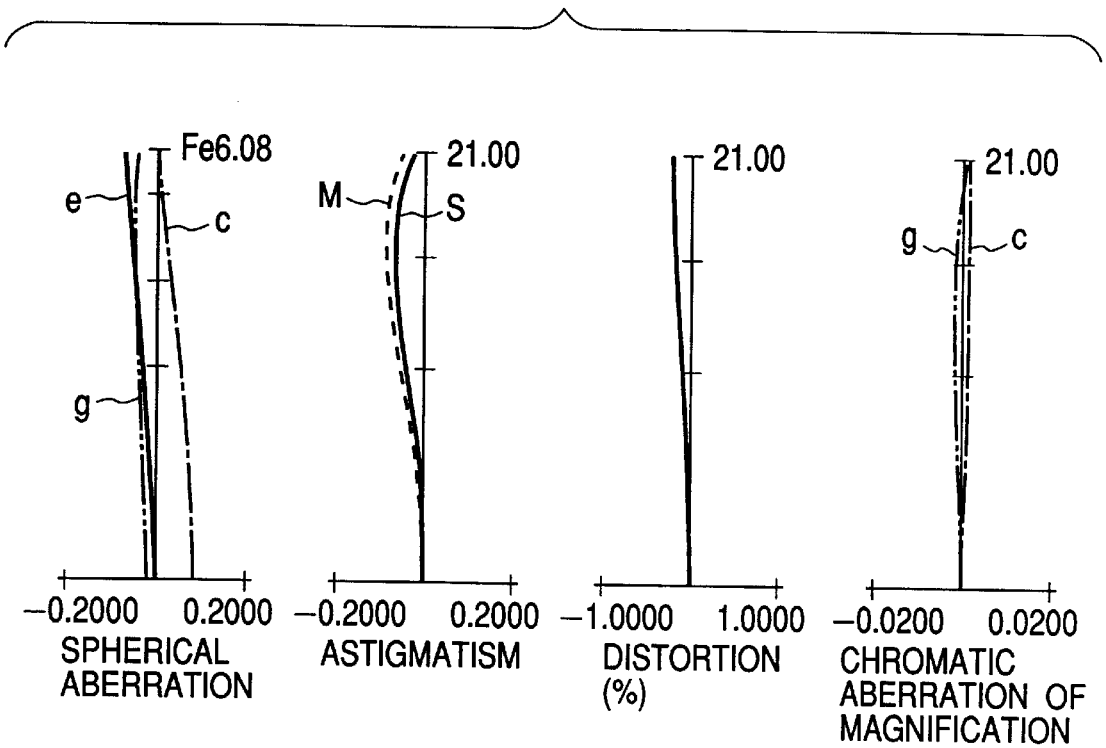
Figure 27B:
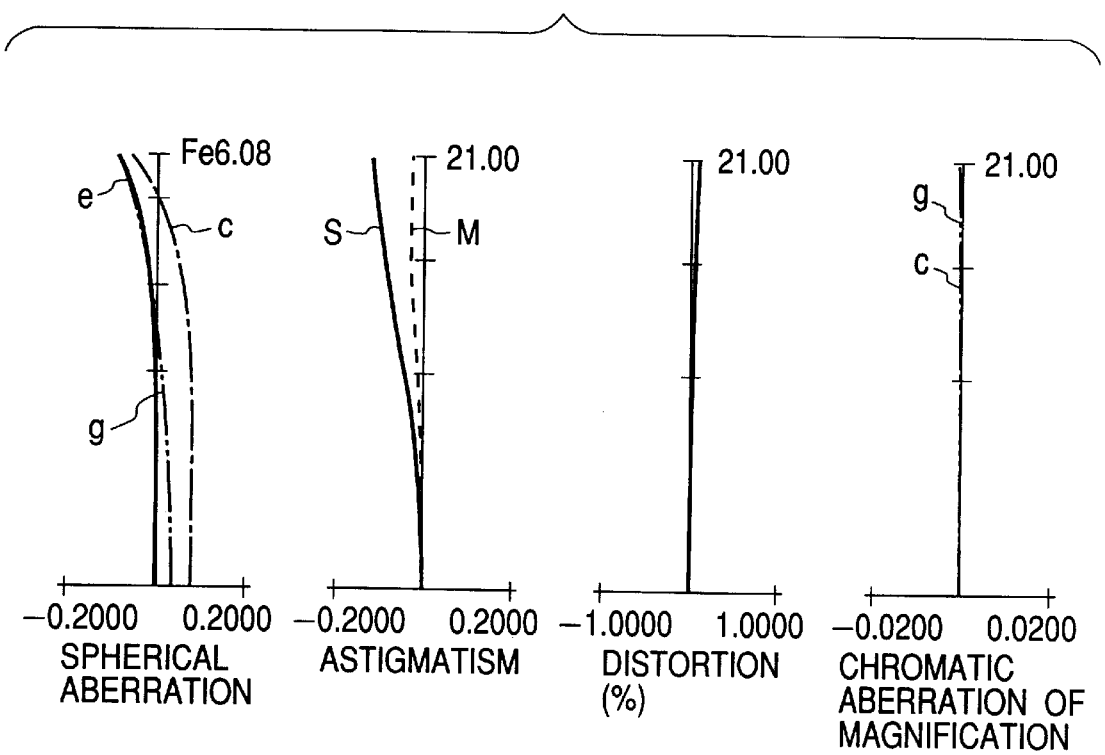
Figure 28A:
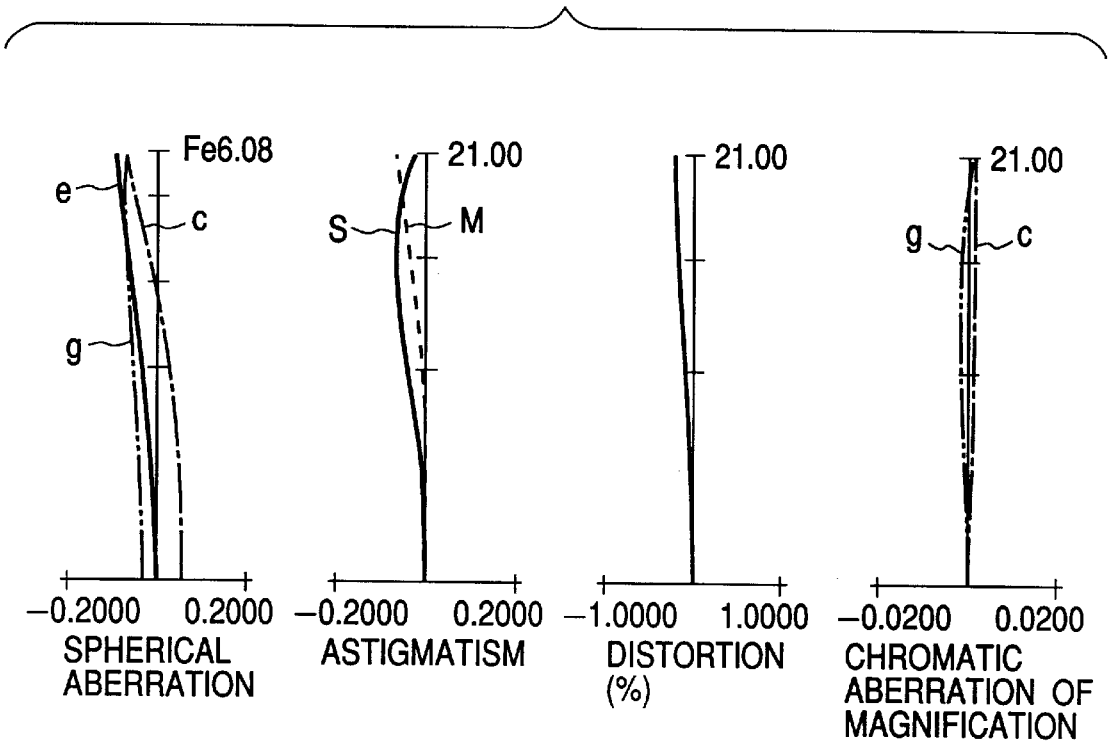
Figure 28B:
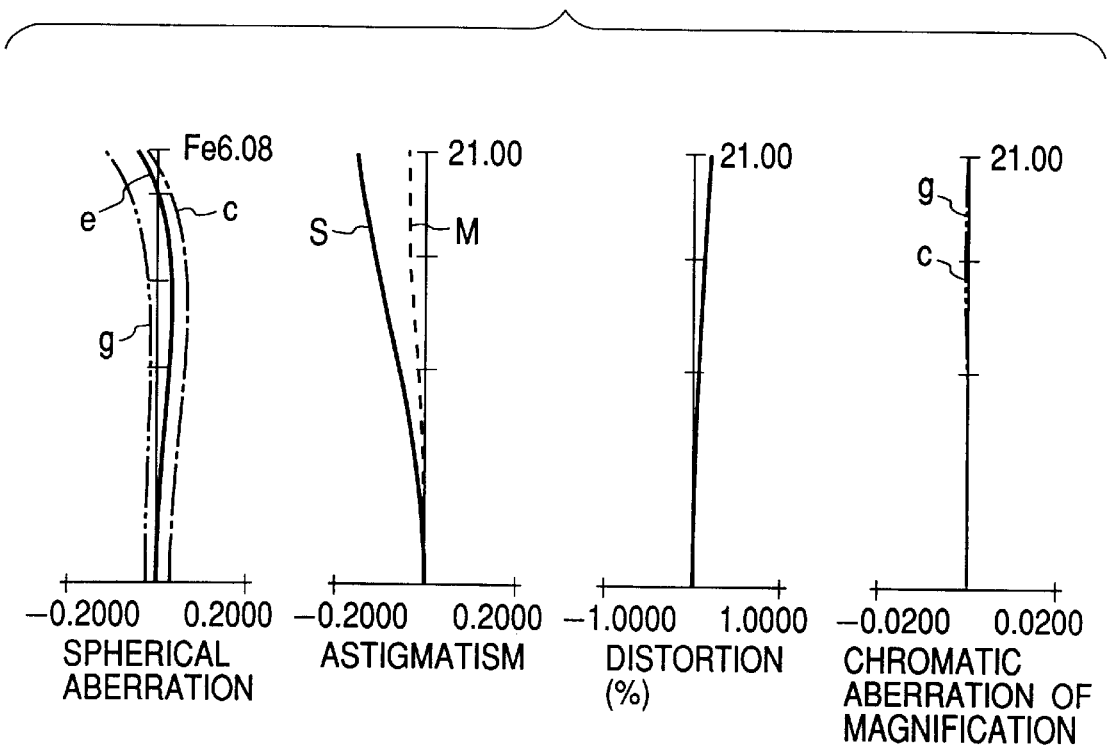

In Numerical Example 10 of FIG. 23, in order from the original surface side, the first unit $L1_{10}$ is constructed in a two-lens configuration composed of a (1-1) negative lens $L11A_{10}$ and a (1-1) positive lens $L11B_{10}$, the second unit $L2_{10}$ is constructed in a three-lens configuration composed of a (2-1) positive lens L12A, a (2-2) positive lens L12B, and a (2-1) negative lens L12C, the third unit $L3_{10}$ is constructed in a two-lens configuration composed of a (3-1) positive lens L13A and a (3-1) negative lens $L13B_{10}$, the diffractive optical element 21 is attached to a lens surface on the image surface side of the (2-1) negative lens L12C of the second unit $L2_{10}$, the stop SP is placed in the second unit $L2_{10}$, and aspherical surfaces 22, 23 are formed in a lens surface on the image surface side of the (1-1) positive lens $L11B_{10}$ of the first unit $L1_{10}$ and in a lens surface on the original surface side of the (3-1) negative lens $L13B_{10}$ of the third unit L3, respectively.

In each numerical example the stop SP is provided in the second unit $L2_1$ through $L2_{10}$ the diffractive optical element 21 near the stop SP, and the aspherical surface in at least one lens unit out of the three lens units $L1_1$ through $L1_{10}$, $L2_1$ through $L2_{10}$, $L3_1$ through $L3_{10}$ of the first, second, and third units. As illustrated in FIGS. 19 to 23, change of magnification (zooming) from the shortest focal length extreme to the longest focal length extreme is achieved in such a manner that with maintaining the object-image distance at a constant finite distance, the first unit $L1_6$ through $L1_{10}$ is moved along a locus of a convex shape on the image surface side, the second and third units $L2_6$ through $L2_{10}$, $L3_6$ through $L3_{10}$ are monotonically moved toward the original surface, and the air space between the first and second units $L2_6$ through $L2_{10}$, $L3_6$ through $L3_{10}$ and the air space between the second and third units L2, L3 are changed concurrently.

In each numerical example the first unit $L1_6$ through $L1_{10}$ has the negative refracting power, thereby decreasing the diameter of the front lens, which tends to be increased by zooming.

In each numerical example zooming is mainly effected by movement of the second and third units $L2_1$ through $L2_{10}$ $L3_1$ through $L3_{10}$ in that structure aberration variation due to the zooming, e.g. in curvature of field, will become larger in the intermediate part of zoom if the zoom ratio is as high as 2; therefore, the aberration variation is controlled to a low level by making the air space variable between the second and third units $L2_1$ through $L2_{10}$, $L3_1$ through $L3_{10}$ Further, the stop SP is placed in the second unit $L2_1$ through $L2_{10}$ so that the lens system is arranged to be as nearly symmetric with respect to the stop as possible, which facilitates correction for distortion, lateral chromatic aberration, and so on.

In each numerical example, a variation in chromatic aberration and variation in curvature of field due to the zooming can be corrected for by optimization of lens shapes in each lens unit, selection of glass materials, and so on. However, the secondary spectrum remains as to axial chromatic aberration, and it is thus difficult to align the focus positions of the three color beams of R (red), G (green), and B (blue) with each other, thus posing the problem of incapability of accurate color reading.

In each numerical example, the secondary spectrum of axial chromatic aberration is corrected for by provision of the diffractive optical element 21 near the stop SP in the second unit $L2_1$ through $L2_{10}$. Specifically, the diffractive optical element is attached to either one lens surface of the (2-1) negative lens L12C on the original surface side of the stop SP. If the diffractive optical element were placed at a position apart from near the stop SP, the other aberration including spherical aberration would be degraded, which is not preferred.

In each numerical example, a variation in curvature of field caused by the zooming is suppressed by providing the aspherical surface in at least one lens unit out of the three lens units $L1_1$ through $L1_{10}$, $L2_1$ through $L2_{10}$, $L3_1$ through $L3_{10}$ of the first, second, and third units. This aspherical surface is preferably provided in a lens surface located apart from the stop SP. As long as this condition is satisfied, the aspherical surface may be provided in either one of the three lens units $L1_1$ through $L1_{10}$, $L2_1$ through $L2_{10}$ $L3_1$ through $L3_{10}$ of the first, second, and third units. Provision of aspherical surfaces in plural surfaces improves the optical performance more.

Change in spherical aberration is suppressed by placing at least two positive lenses on the original surface side with respect to the stop SP in the second unit $L2_1$ through $L2_{10}$. This implements the zoom lens for an image scanner that is as bright as the effective F-number (FNo) of about F6 and that has the zoom ratio of 2, in each numerical example.

Further, the zoom lenses of the present invention preferably satisfy each condition equation below in order to keep a higher performance.

Specifically, where image magnifications at the shortest focal length of the second and third units $L2_1$ through $L2_{10}$, $L3_1$ through $L3_{10}$ are $\beta_{2w}$, $\beta_{3w}$, respectively, the following conditions are satisfied:

$$0.7<|\beta_{2w}\times\beta_{3w}|<1.1 \tag{5}$$

and $$\beta_{2w}\times\beta_{3w}<0$$

Where the phase function of the diffractive optical element 21 is defined by the following equation:

$$\phi(h)=(2\pi/\lambda)\Sigma C_i h^i$$

($\lambda$ is a reference wavelength, h a height from the optic axis, and i a degree)
and where a focal length at the shortest focal length of the overall system is fw,
the following condition is satisfied:

$$0.005<|C_2\times fw|<0.03 \tag{6}$$

$$(C_2<0)$$

In the condition, $C_2$ indicates the coefficient $C_2$ of the phase function of the diffractive optical element 21.

The condition equation (5) is a condition for restricting the lens diameter on the original surface side to a small level on the short focal length side where the angle of field on the original surface side is large and for suppressing that occurrence of distortion and is effective for maintaining the symmetry of the lens shape before and after the stop SP by keeping the first unit $L1_1$ through $L1_{10}$ from being separated from the second unit $L2_1$ through $L2_{10}$ as much as possible.

In the range over the upper limit of condition equation (5):, the total magnification of the second and third units $L2_1$ through $L2_{10}$, $L3_1$ through $L3_{10}$ will be large on the high magnification side, so as to increase the aberration variation due to zooming, which is not preferable. In the range below the lower limit of condition equation (5), particularly, the symmetry of the lens system with respect to the stop SP is destroyed, so as to cause the occurrence of distortion and an increase in the size of the front lens, which is not preferable.

Condition equation (6) specifies an appropriate value for the refracting power of the diffractive optical element 21. Condition equation (6) is for correcting for a variation in axial chromatic aberration due to zooming while suppressing bending of spherical aberration. In the range over the upper limit of condition equation (6) the negative effect appears great on aberration except for chromatic aberration. In the range below the lower limit of condition equation (6) the intrinsic correction effect is weakened, which is not preferable.

The diffractive optical element 21 in each numerical example is an optical element for refracting or reflecting light according to the law of diffraction:

$$n \sin \theta - n' \sin \theta' = \lambda m/d$$

(n is an index of refraction of a medium on the incidence side, n' an index of refraction of a medium on the emergence side, θ an angle of incidence of ray, θ' an angle of emergence of ray, λ a wavelength, and d a grating pitch).

Ordinary glasses for the refracting optical elements have dispersion represented by the following:

$$v = (n-1)/\Delta n;$$

whereas the diffractive optical elements have dispersion represented by the following:

$$v = \lambda/\Delta \lambda$$

Abbe's numbers of the ordinary glasses are approximately 20 to 95, whereas the diffractive optical elements has the constant Abbe's number v=−3.453. This means that the diffractive optical elements have the negative Abbe's number while the ordinary glasses have the positive Abbe's numbers. The diffractive optical elements also have the partial dispersion ratio greatly different from those of the ordinary glasses.

In each numerical example, color correction is effectively achieved by making use of such optical characteristics of the diffractive optical element.

This. diffractive optical element can be expressed by the following phase equation.

$$\phi(h) = (2\pi/\lambda)(c_1 h^1 + c_2 h^2 + c_3 h^3 + c_4 h^4 + c_5 h^5 \ldots) \quad (7)$$

In the above equation φ(h) represents the phase, h a distance in the radial direction from the optic axis of lens, and λ the reference wavelength. Namely, a diffractive optical element is expressed by adding the phase to the reference surface of lens.

FIG. 11 is an explanatory diagram to show a diffraction grating shape of the diffractive optical element 21 in each numerical example, which is the kinoform shape.

FIG. 12 is an explanatory diagram to show the wavelength dependence characteristics of first-order diffraction efficiency of the diffractive optical element illustrated in FIG. 11. The structure of the actual diffraction grating is formed by coating the surface of a base material (glass substrate) 102 with an ultraviolet-curing resin to form grating 103 having such a grating thickness t that the first-order diffraction efficiency is 100% at the wavelength 530 nm, in the resin portion, as illustrated in FIG. 11. As apparent from FIG. 12, the diffraction efficiency in the designed order decreases as the wavelength becomes more apart from the wavelength 530 nm of the optimized wavelength, while diffracted light of orders near the designed order, i.e., zero-order and second-order diffracted light increases on the other hand. The increase of the diffracted light of the other orders than the designed order results in flare and in turn lowering the resolution of the optical system.

FIG. 13 shows the average MTF characteristics in the visible region at the shortest focal length extreme against spatial frequency where each numerical example described previously is prepared with the grating shape of FIG. 11. It is seen from FIG. 13 that MTF in the low frequency region is lower than desired values.

Therefore, each numerical example gains the desired MTF characteristics by employing as a grating shape of the diffractive optical elements a stack type diffraction grating in which plural diffraction gratings 104, 105 are stacked on the base material 102, for example as illustrated in FIG. 14, without having to be limited to the diffraction grating shape illustrated in FIG. 11.

FIG. 15 is an explanatory diagram to show the wavelength dependence characteristics of first-order diffraction efficiency of the diffractive optical element of this structure. A specific configuration is formed by first forming the first diffraction grating 104 of an ultraviolet-curing resin (nd= 1.499, vd=54) on the base material 102 and further forming the second diffraction grating 105 of another ultraviolet-curing resin (nd=1.598, vd=28) thereon, as illustrated in FIG. 14. In this combination of the materials the grating thickness t1 of the first diffraction grating 104 is t1=13.8 μm and the grating thickness t2 of the second diffraction grating is t2=10.5 μm. As. apparent from FIG. 15, the diffraction grating of the stack structure has high diffraction efficiencies of the designed order of 95% or more throughout the entire use wavelength region.

FIG. 16 shows the MTF characteristics against spatial frequency in this case. It is seen from FIG. 16 that use of the diffraction grating of the stack structure improves MTF in the low frequency region and desired MTF characteristics are obtained. The optical performance is further improved by using the diffraction grating of the stack structure as a diffractive optical element as described above.

The materials for the diffractive optical element of the above-stated stack structure are not limited to the ultraviolet-curing resins, but other plastic materials can also be used. The first diffraction grating 104 may also be formed directly on the base material, depending upon the base material. The thicknesses of the respective gratings do not always have to be different from each other, but the two diffraction gratings 104, 105 may have respective grating thicknesses equal to each other, depending upon the combination of materials, as illustrated in FIG. 17. In this case, because the grating shape is not formed in the surface of the diffractive optical element, a cheaper optical system can be provided with excellent dustproof capability and with improved assembling operability of the diffractive optical element.

FIG. 18 is a schematic diagram of the major part of the application where the zoom lens of the present invention is applied to an image scanner.

In the same figure reference numeral 1 designates an original glass plate and an original (image) 7 is mounted on the original glass plate 1. Letter A represents the length of the original in the sub-scanning direction. Numeral 8 denotes a slit, which is provided near the surface of the original 7. Numerals 2, 3, 4 represent first, second, and third mirrors, respectively, which bend a beam based on image information from the original surface to guide it to the imaging means described below. In the present embodiment, a ratio of movement of the first mirror 2 to the mirror unit composed of the second and third mirrors 3, 4 is set to 2:1 in order to keep the optical pathlength constant between the original surface A and a line sensor 6, described below, during slit scanning. Numeral 5 designates a zoom lens as an imaging means according to the present invention, which is composed of the three lens units as described previously. The zoom lens 5 is fixed during the slit scanning, but moves between position 5a and position 5b during zooming. The slit scanning range with zooming is limited, for example, to the range B. Numeral 6 indicates a line sensor (CCD) as a reading means elongated in the direction normal to the plane of the drawing.

In the present embodiment the light from the original on the original glass plate 1 illuminated by the illuminating means (not illustrated) is focused on the surface of the line sensor 6 via the first, second, third mirrors 2, 3, 4 by the imaging means 5 and the image of the original 7 is read by the line sensor 6.

In the present embodiment, when the original (image) is doubled by zooming and when the reading width of the line sensor (CCD) is constant, the original reading width is half and the slit scanning range is also half. Therefore, the reading dot size on the original surface is half that in the full scan, so that finer image reading can be performed during enlargement.

There arises, however, a problem that the effective F-number on the line sensor side needs to be kept constant where the reading speed of the line sensor is not changed during enlargement. The focal length of the overall system during enlargement becomes longer, so that a brighter F-number is necessary than in the case of the full scan. Further, in the case of the color reading, because the pixel pitch of the line sensor is constant, color deviation on the original surface needs to be suppressed to a low level during enlargement.

As described above, the zoom lenses for image scanner have the problem that the conditions for correction for aberration due to zooming are stricter than in the case of the ordinary zoom lenses, for example, such as the photographic lenses, as described above.

The present embodiment thus solves the above problem and assures the desired zoom performance by composing the zoom lens 5 of the three lens units, properly setting the lens configuration of each lens unit, and properly providing the diffractive optical element in the second unit and the aspherical surface in at least one lens unit out of the three lens units of the first, second, and third units.

Numerical Examples 6 to 10 of the present invention will be detailed below.

In Numerical Examples 6 to 10, ri represents a radius of curvature of the ith lens surface when counted from the original surface side, di represents the ith lens thickness or air space when counted from the original surface side and ni and vi represents a refractive index and an Abbe's number, respectively, of glass of the ith lens when counted from the original surface side. Coefficients of the phase equation will be provided for the diffractive optical element and aspherical coefficients for the aspherical surface.

The relationship between the condition equations described previously and various numerals in the respective numerical examples will be given in Table 2.

An aspherical shape is expressed by the following equation where the x-axis is taken along the optic-axis direction, the h-axis is taken along a direction perpendicular to the optic axis, the traveling direction of light is positive, the radius of paraxial curvature is r, and aspherical coefficients are B, C, and D;

$$x = \frac{(1/r)h^2}{1+\sqrt{1-(h/r)^2}} + Bh^4 + Ch^6 + Dh^8$$

The diffractive surface of the diffractive optical element is expressed by the following equation where $\phi(h)$ is the phase function, the reference wavelength is: $\lambda$, a height from the optic axis of lens is h, and phase coefficients are $C_2$, $C_4$, and $C_6$.

$$\phi(h) = (2\pi/\lambda)(C_2 h^2 + C_4 h^4 + C_6 h^6)$$

Numerical Example 6 f = 50.00 to 77.72    effective Fno = 1:6.08
image magnification = −0.19 to −0.38

| | | | |
|---|---|---|---|
| r1 = −489.264 | d1 = 1.80 | n1 = 1.80811 | v1 = 46.6 |
| r2 = 38.804 | d2 = 9.38 | | |
| r3 = 45.608 | d3 = 3.00 | n2 = 1.85501 | v2 = 23.9 |
| r4 = 74.964 | d4 = variable | | |
| r5 = 38.227 | d5 = 5.41 | n3 = 1.60548 | v3 = 60.7 |
| r6 = −90.519 | d6 = 3.62 | | |
| r7 = 36.150 | d7 = 6.50 | n4 = 1.81077 | v4 = 41.0 |
| r8 = 417.475 | d8 = 0.97 | | |
| r9 = −82.841 | d9 = 6.50 | n5 = 1.85501 | v5 = 23.9 |
| *r10 = 40.881 | d10 = 1.84 | | |
| r11 = (stop) | d11 = variable | | |
| r12 = 257.819 | d12 = 5.37 | n6 = 1.73427 | v6 = 40.6 |
| *r13 = −59.578 | d13 = 3.12 | | |
| r14 = −19.262 | d14 = 1.80 | n7 = 1.59143 | v7 = 61.2 |
| r15 = −30.800 | d15 = variable | | |
| r16 = ∞ | d16 = 0.70 | n8 = 1.51825 | v8 = 64.2 |
| r17 = ∞(image plane) | | | |

| Focal length | 50.00 | 77.72 | 63.88 |
|---|---|---|---|
| Variable distances | | | |
| d4 | 25.07 | 0.80 | 10.13 |
| d11 | 20.83 | 16.75 | 18.07 |
| d15 | 35.52 | 75.47 | 53.72 |

[Phase coefficients]
(r10 surface)

| c2 | c3 | c4 |
|---|---|---|
| −2.03880D−04 | 0.00000D+00 | 1.98930D−07 |

| c5 | c6 |
|---|---|
| 0.00000D+00 | −2.72250D−09 |

[Aspherical coefficients]
(r13 surface)

| B | C | D |
|---|---|---|
| −9.76722D−07 | −4.16710D−09 | −7.64856D−12 |

Object-image distance: 406.98
Focal lengths of the respective lens units
  first unit $L1_1$-$L1_{10}$ −73.514
  second unit $L2_1$-$L2_{10}$ 46.142
  third unit $L3_1$-$L3_{10}$ 221.92

Numerical Example 7 f = 50.12 to 77.72    effective Fno = 1:6.08
image magnification = −0.19 to −0.38

| | | | |
|---|---|---|---|
| r1 = −247.347 | d1 = 1.80 | n1 = 1.77621 | v1 = 49.6 |
| r2 = 35.239 | d2 = 7.98 | | |
| r3 = 43.797 | d3 = 3.06 | n2 = 1.76859 | v2 = 26.5 |
| r4 = 89.771 | d4 = variable | | |
| r5 = 43.653 | d5 = 5.18 | n3 = 1.69401 | v3 = 54.8 |
| r6 = −101.960 | d6 = 0.20 | | |
| r7 = 42.919 | d7 = 6.50 | n4 = 1.77621 | v4 = 49.6 |
| r8 = 1487.782 | d8 = 1.65 | | |
| r9 = −83.709 | d9 = 6.50 | n5 = 1.85501 | v5 = 23.9 |

-continued

Numerical Example 7

| *r10 = 56.834 | d10 = 6.16 | | |
|---|---|---|---|
| r11 = ∞ (stop) | d11 = variable | | |
| r12 = 764.531 | d12 = 6.50 | n6 = 1.80811 | v6 = 46.6 |
| *r13 = −62.231 | d13 = 2.81 | | |
| r14 = −19.955 | d14 = 1.80 | n7 = 1.57088 | v7 = 63.2 |
| r15 = −32.791 | d15 = variable | | |
| r16 = ∞ | d16 = 0.70 | n8 = 1.51825 | v8 = 64.2 |
| r17 = ∞(image plane) | | | |

| Focal length | 50.12 | 77.72 | 63.90 |
|---|---|---|---|
| Variable distances | | | |
| d4 | 22.89 | 0.80 | 9.34 |
| d11 | 17.88 | 13.36 | 14.80 |
| d15 | 37.45 | 78.53 | 56.30 |

[Phase coefficients]
(r10 surface)

| c2 | c3 | c4 |
|---|---|---|
| −1.85570D−04 | 0.00000D+00 | 2.31940D−07 |

| c5 | c6 |
|---|---|
| 0.00000D+00 | −9.03490D−10 |

[Aspherical coefficients]
(r2 surface)

| B | C | D |
|---|---|---|
| −5.16886D−07 | −8.67561D−10 | −7.17236D−13 |

Object-image distance: 406.98

Focal lengths of the respective lens units first unit $L1_1$-$L1_{10}$ −69.079 second unit $L2_1$-$L2_{10}$ 44.794 third unit $L3_1$-$L3_{10}$ 282.10

Numerical Example 8 f = 50.88 to 78.20   effective Fno = 1:6.08
image magnification = −0.19 to −0.38

| r1 = −190.109 | d1 = 1.80 | n1 = 1.80811 | v1 = 46.6 |
|---|---|---|---|
| r2 = 36.987 | d2 = 6.13 | | |
| r3 = 42.152 | d3 = 3.17 | n2 = 1.81265 | v2 = 25.4 |
| r4 = 86.438 | d4 = variable | | |
| r5 = 41.459 | d5 = 5.76 | n3 = 1.69401 | v3 = 54.8 |
| r6 = −83.850 | d6 = 0.52 | | |
| r7 = 36.608 | d7 = 6.50 | n4 = 1.72056 | v4 = 47.9 |
| r8 = 622.363 | d8 = 1.24 | | |
| r9 = −76.515 | d9 = 6.50 | n5 = 1.85501 | v5 = 23.9 |
| *r10 = 47.754 | d10 = 6.36 | | |
| r11 = ∞ (stop) | d11 = variable | | |
| r12 = 497.421 | d12 = 2.32 | n6 = 1.80401 | v6 = 42.2 |
| *r13 = −68.803 | d13 = 4.10 | | |
| r14 = −17.647 | d14 = 1.80 | n7 = 1.48915 | v7 = 70.2 |
| r15 = −27.949 | d15 = variable | | |
| r16 = ∞ | d16 = 0.70 | n8 = 1.51825 | v8 = 64.2 |
| r17 = (image plane) | | | |

| Focal length | 50.88 | 78.20 | 64.53 |
|---|---|---|---|
| Variable distances | | | |
| d4 | 20.71 | 0.80 | 8.54 |
| d11 | 17.67 | 13.34 | 14.80 |
| d15 | 35.20 | 75.26 | 53.44 |

-continued

Numerical Example 8

[Phase coefficients]
(r9 surface)

| c2 | c3 | c4 |
|---|---|---|
| −1.44040D−04 | 0.00000D+00 | −1.47300D−07 |

| c5 | c6 |
|---|---|
| 0.00000D+00 | −2.65980D−10 |

[Aspherical coefficients]
(r14 surface)

| B | C | D |
|---|---|---|
| 1.27585D−07 | 1.19181D−08 | 4.00623D−12 |

Object-image distance: 406.98

Focal lengths of the respective lens units first unit $L1_1$-$L1_{10}$ −67.803 second unit $L2_1$-$L2_{10}$ 42.597 third unit $L3_1$-$L3_{10}$ 255.66

Numerical Example 9 f = 49.84 to 77.47   effective Fno = 1:6.08
image magnification = −0.19 to −0.38

| r1 = −339.318 | d1 = 1.80 | n1 = 1.77621 | v1 = 49.6 |
|---|---|---|---|
| r2 = 38.608 | d2 = 10.56 | | |
| r3 = 45.687 | d3 = 3.00 | n2 = 1.85501 | v2 = 23.9 |
| r4 = 70.234 | d4 = variable | | |
| r5 = 42.430 | d5 = 5.20 | n3 = 1.64512 | v3 = 58.4 |
| r6 = −381.547 | d6 = 2.70 | | |
| r7 = 42.322 | d7 = 6.50 | n4 = 1.69979 | v4 = 55.5 |
| r8 = −103.950 | d8 = 2.21 | | |
| r9 = −60.646 | d9 = 6.50 | n5 = 1.85501 | v5 = 23.9 |
| *r10 = 129.619 | d10 = 3.17 | | |
| r11 = (stop) | d11 = 18.92 | | |
| r12 = −26.204 | d12 = 1.80 | n6 = 1.58879 | v6 = 30.8 |
| *r13 = −41.619 | d13 = variable | | |
| r14 = −940.339 | d14 = 2.88 | n7 = 1.83932 | v7 = 37.2 |
| r15 = −43.926 | d15 = 2.78 | | |
| r16 = −18.867 | d16 = 1.80 | n8 = 1.60548 | v8 = 60.7 |
| r17 = −29.893 | d17 = variable | | |
| r18 = ∞ | d18 = 0.70 | n9 = 1.51825 | v9 = 64.2 |
| r19 = ∞ (image plane) | | | |

| Focal length | 49.84 | 77.47 | 63.65 |
|---|---|---|---|
| Variable distances | | | |
| d4 | 24.06 | 0.80 | 9.70 |
| d13 | 3.45 | 0.20 | 1.13 |
| d17 | 35.38 | 75.23 | 53.47 |

[Phase coefficients]
(r10 surface)

| c2 | c3 | c4 |
|---|---|---|
| −1.48820D−04 | 0.00000D+00 | −9.56020D−08 |

| c5 | c6 |
|---|---|
| 0.00000D+00 | −1.84290D−09 |

-continued

Numerical Example 9

[Aspherical coefficients]
(r12 surface)

| B | C | D |
|---|---|---|
| 1.05105D−06 | 1.22116D−08 | 6.47327D−11 |

Object-image distance: 406.98
Focal lengths of the respective lens units
   first unit $L1_1$-$L1_{10}$ −69.839
   second unit $L2_1$-$L2_{10}$ 44.990
   third unit $L3_1$-$L3_{10}$ 137.59

Numerical Example 10 f = 50.34 to 77.87    effective Fno = 1:6.08
image magnification = −0.19 to −0.38

| r1 = −241.212 | d1 = 1.80 | n1 = 1.79013 | ν1 = 44.2 |
|---|---|---|---|
| r2 = 36.369 | d2 = 7.65 | | |
| r3 = 47.805 | d3 = 3.00 | n2 = 1.85501 | ν2 = 23.9 |
| r4 = 97.937 | d4 = variable | | |
| r5 = 42.185 | d5 = 5.44 | n3 = 1.64512 | ν3 = 58.4 |
| r6 = −89.698 | d6 = 1.50 | | |
| r7 = 36.603 | d7 = 6.50 | n4 = 1.80401 | ν4 = 42.2 |
| r8 = 729.165 | d8 = 0.99 | | |
| r9 = −94.262 | d9 = 6.50 | n5 = 1.85501 | ν5 = 23.9 |
| *r10 = 40.909 | d10 = 5.30 | | |
| r11 = ∞ (stop) | d11 = variable | | |
| r12 = 189.833 | d12 = 4.93 | n6 = 1.70557 | ν6 = 41.2 |
| *r13 = −82.817 | d13 = 3.85 | | |
| r14 = −18.230 | d14 = 1.80 | n7 = 1.60548 | ν7 = 60.7 |
| r15 = −25.517 | d15 = variable | | |
| r16 = ∞ | d16 = 0.70 | n8 = 1.51825 | ν8 = 64.2 |
| r17 = ∞ (image plane) | | | |

| Focal length | 50.34 | 77.87 | 64.10 |
|---|---|---|---|
| Variable distances | | | |
| d4 | 22.89 | 0.80 | 9.36 |
| d11 | 18.36 | 14.09 | 15.51 |
| d15 | 35.20 | 75.47 | 53.56 |

[Phase coefficients]
(r10 surface)

| c2 | c3 | c4 |
|---|---|---|
| −2.10390D−04 | 0.00000D+00 | −1.00460D−07 |

| c5 | | c6 |
|---|---|---|
| 0.00000D+00 | | −1.71220D−09 |

[Aspherical coefficients]
(r4 surface)

| B | C | D |
|---|---|---|
| −4.45035D−07 | −3.98520D−10 | −2.78287D−13 |

(r14 surface)

| | | |
|---|---|---|
| 1.21955D−07 | 5.52230D−09 | 4.34741D−12 |

Object-image distance: 406.98
Focal lengths of the respective lens units
   first unit $L1_1$-$L1_{10}$ −70.500
   second unit $L2_1$-$L2_{10}$ 44.397
   third unit $L3_1$-$L3_{10}$ 269.10

TABLE 2

| Condition | Numerical Examples | | | | |
|---|---|---|---|---|---|
| equations | 6 | 7 | 8 | 9 | 10 |
| (5) $\beta_{2w} \cdot \beta_{3w}$ | −0.889 | −0.940 | −0.981 | −0.921 | −0.932 |
| (6) $C_2 \cdot fw$ | −0.0102 | −0.0093 | −0.0073 | −0.0074 | −0.0106 |

The grating pitch and depth of the diffractive optical element in each numerical example are both in the adequately manufacturable range. For example, where the diffractive optical element in Numerical Example 6 is prepared as a diffractive optical element of the single layer structure, the minimum grating pitch is about 160 μm and the depth is 0.83 μm, and they are of the adequately manufacturable level.

The present invention can realize the zoom lenses ready for color reading and the image scanner using the zoom lens with the high zooming ratio of about 2.0 and with the high optical performance throughout the entire zooming range, by properly setting the lens configuration of each lens unit of the three-unit zoom lens and providing the diffractive optical element in the second unit and the aspherical surface in at least one lens unit out of the three lens units of the first, second, and third units as described above.

What is claimed is:

1. A zoom lens consisting of three lens units, said three lens units being a first unit having a negative refracting power, a second unit having a positive refracting power, and a third unit having a positive refracting power in the stated order from the side of an original surface, in which zooming is effected by changing an air space between the first unit and the second unit and an air space between the second unit and the third unit, wherein said three lens units move on the optical axis during zooming and said second unit has a diffractive optical element, and wherein, in order from the side of the original surface, said first unit has three lenses, said three lenses being a negative lens, a negative lens, and a positive lens, said second unit has five lenses, said five lenses being a positive lens, a positive lens, a negative lens, a negative lens, and a positive lens, and said third unit has two lenses, said two lenses being a positive lens and a negative lens.

2. A zoom lens according to claim 1, wherein said first and second units have first and second diffractive optical elements, respectively.

3. The zoom lens according to claim 2, wherein said first diffractive optical element corrects variation in lateral chromatic aberration due to the zooming and said second diffractive optical element corrects variation in axial chromatic aberration due to the zooming.

4. The zoom lens according to claim 2, wherein a stop is placed in said second unit and said second diffractive optical element is placed adjacent the stop.

5. The zoom lens according to claim 2, wherein said first diffractive optical element is attached to a negative refracting surface of a lens forming said first unit.

6. The zoom lens according to claim 2, wherein the following conditions are satisfied:

$$0.7 < |\beta_{2w} \times \beta_{3w}| < 1.1$$

and $$\beta_{2w} \times \beta_{3w} < 0$$

where $\beta_{2w}$ and $\beta_{3w}$ are image magnifications at the shortest focal length of said second and third units, respectively.

7. The zoom lens according to claim 2, wherein the following conditions are satisfied:

$$0.0005 < C_{2(1)} \times fw < 0.005$$

$$0.005 < |C_{2(2)} \times fw| < 0.03$$

$$C_{2(2)} < 0$$

where phase functions of said first and second diffractive optical elements are defined by the following equation:

$$\phi_j(h) = (2\pi/\lambda) \Sigma C_{i(j)} h^i$$

wherein $C_{i(j)}$ represents a phase coefficient, $\lambda$ is a reference wavelength, h is a height from the optical axis, i is a degree, and j is a number of each diffractive optical element, and where a focal length at the shortest focal length of the overall system is fw.

8. The zoom lens according to claim 2, wherein each of said first and second diffractive optical elements is comprised of a stack type diffraction grating in which a plurality of diffraction gratings are stacked on a glass substrate.

9. The zoom lens according to claim 2, wherein zooming from the shortest focal length extreme to the longest focal length extreme is effected by moving said first unit along a locus of a convex shape on an image surface side and monotonically moving said second and the third units toward the original surface, and wherein an object-image distance is constant.

10. The zoom lens according to claim 9, wherein, in order from the side of the original surface, said first unit has four lenses, said four lenses being a negative lens, a positive lens, a negative lens, and a positive lens.

11. The zoom lens according to claim 1, wherein a stop is placed adjacent said diffractive optical element.

12. An image reading apparatus having a zoom lens as set forth in any one of claims 1 through 9, 10, and 11 and a reading means.

* * * * *

UNITED STATES PATENT AND TRADEMARK OFFICE
CERTIFICATE OF CORRECTION

PATENT NO. : 6,542,301 B1
DATED : April 1, 2003
INVENTOR(S) : Kazuo Fujibayashi

It is certified that error appears in the above-identified patent and that said Letters Patent is hereby corrected as shown below:

Column 2,
Line 29, "is:" should read -- is --.
Line 56, "$_{3w}$" should read -- $\beta_{3w}$ --.

Column 3,
Line 22, "lens-," should read -- lens, --.

Column 6,
Line 27, "In" should read -- (In --.
Line 54, "negative:" should read -- negative --.

Column 7,
Line 41, "lens $L2D_u$," should read -- $L2D_4$ --.

Column 8,
Line 9, "units $L2_{10}$," should read -- units $L2_1$ through $L2_{10}$, --.
Line 19, "example" should read -- example, --.
Line 26, "through $L3_{10}$" should read -- through $L3_{10}$. --.

Column 11,
Line 11, "d2" should read -- t2 --.
Line 13, "efficiencies,of" should read -- efficiencies of --.
Line 44, "respectively,:" should read -- respectively, --.

Column 19,
Line 16, "L3," should read -- $L3_{10}$, --.
Line 30, "$L2_6$ through $L2_{10}$, $L3_6$ through $L3_{10}$" should read -- $L1_6$ through $L1_{10}$, $L2_6$ through $L2_{10}$ --.
Line 37, "example" should read -- example, --.
Line 44, "$L3_{10}$," should read -- $L3_{10}$. --.

Column 20,
Line 9, "$L2_1$, through $L2_{10}$" should read -- $L2_1$ through $L2_{10}$, --.
Line 51, "that" should read -- the --.
Line 57, "(5):," should read -- (5), --.

UNITED STATES PATENT AND TRADEMARK OFFICE
CERTIFICATE OF CORRECTION

PATENT NO. : 6,542,301 B1
DATED : April 1, 2003
INVENTOR(S) : Kazuo Fujibayashi

It is certified that error appears in the above-identified patent and that said Letters Patent is hereby corrected as shown below:

<u>Column 21,</u>
Line 38, "This." should read -- This --.

<u>Column 23,</u>
Line 3, "Sa" should read -- 5a --.
Line 45, "side" should read -- side, --.
Line 67, "is:" should read -- is --.

<u>Column 24,</u>
Line 19, "r11 = (stop)" should read -- r11 = ∞ (stop) --.

<u>Column 25,</u>
Line 59, "r17 = (image plane)" should read -- r17 = ∞ (image plane) --.

<u>Column 26,</u>
Line 43, "r11 = (stop)" should read -- r11 = ∞ (stop) --.

Signed and Sealed this

Fourteenth Day of October, 2003

JAMES E. ROGAN
*Director of the United States Patent and Trademark Office*